United States Patent
Bushelman et al.

(10) Patent No.: US 10,538,667 B2
(45) Date of Patent: Jan. 21, 2020

(54) TOUGHENED POLY(ARYL ETHER SULFONE)/POLY(ARYL ETHER KETONE) BLENDS

(71) Applicant: SOLVAY SPECIALTY POLYMERS USA, LLC, Alpharetta, GA (US)

(72) Inventors: Corinne Bushelman, Cumming, GA (US); Glenn P. Desio, Marietta, GA (US); William E. Sattich, Cumming, GA (US)

(73) Assignee: SOLVAY SPECIALTY POLYMERS USA, LLC., Aplharetta, GA (US)

( * ) Notice: Subject to any disclaimer, the term of this patent is extended or adjusted under 35 U.S.C. 154(b) by 50 days.

(21) Appl. No.: 15/757,942

(22) PCT Filed: Sep. 9, 2016

(86) PCT No.: PCT/EP2016/071329
§ 371 (c)(1),
(2) Date: Mar. 6, 2018

(87) PCT Pub. No.: WO2017/042349
PCT Pub. Date: Mar. 16, 2017

(65) Prior Publication Data
US 2018/0340066 A1 Nov. 29, 2018

Related U.S. Application Data

(60) Provisional application No. 62/216,115, filed on Sep. 9, 2015.

(30) Foreign Application Priority Data

Nov. 23, 2015 (EP) ..................................... 15195914

(51) Int. Cl.
C08G 65/40 (2006.01)
C08L 81/06 (2006.01)

(52) U.S. Cl.
CPC ........... *C08L 81/06* (2013.01); *C08L 2201/08* (2013.01); *C08L 2203/20* (2013.01); *C08L 2205/03* (2013.01); *C08L 2205/035* (2013.01)

(58) Field of Classification Search
USPC ......................................................... 528/390
See application file for complete search history.

(56) References Cited

U.S. PATENT DOCUMENTS

| | | |
|---|---|---|
| 3,287,443 A | 11/1966 | Saito et al. |
| 3,657,391 A | 4/1972 | Curfman |
| 3,808,180 A | 4/1974 | Owens |
| 3,985,704 A | 10/1976 | Jones et al. |
| 4,096,202 A | 6/1978 | Farnham et al. |
| 4,180,494 A | 12/1979 | Fromuth et al. |
| 4,260,693 A | 4/1981 | Liu |
| 4,299,928 A | 11/1981 | Witman |
| 5,773,520 A | 6/1998 | Bertelo et al. |
| 9,938,408 B2* | 4/2018 | Gautam ................. C08L 81/06 |
| 2010/0016518 A1 | 1/2010 | El-Hibri et al. |
| 2016/0114563 A1* | 4/2016 | Underwood ............ B32B 15/08 |
| | | 428/35.9 |

FOREIGN PATENT DOCUMENTS

| | | |
|---|---|---|
| EP | 2738219 A1 | 6/2014 |
| WO | 2008116939 A2 | 10/2008 |

OTHER PUBLICATIONS

Standard ASTM D3418, "Standard Test Method for Transition Temperatures and Enthalpies of Fusion and Crystallization of Polymers by Differential Scanning Calorimetry", 2008, p. 1-7.

* cited by examiner

*Primary Examiner* — Terressa Boykin
(74) *Attorney, Agent, or Firm* — Jarrod N. Raphael

(57) ABSTRACT

Toughened poly(aryl ether sulfone)/poly(aryl ether ketone) blends. The present invention relates to polymer compositions including at least one poly(aryl ether sulfone) (PASS) polymer, at least one poly(aryletherketone) (PAEK) polymer, and at least one impact modifier (IM). The polymer composition may optionally include at least one aromatic polycarbonate (PC) and/or titanium dioxide ($TiO_2$), The polymer composition is particularly suitable for use in mobile electronic devices.

15 Claims, No Drawings

TOUGHENED POLY(ARYL ETHER SULFONE)/POLY(ARYL ETHER KETONE) BLENDS

CROSS-REFERENCE TO RELATED APPLICATIONS

This application claims priority to U.S. Provisional Application No. 62/216,115 filed Sep. 9, 2015, and European Application No. EP 15195914.5, filed Nov. 23, 2015, each of which is incorporated herein by reference in its entirety.

FIELD OF THE INVENTION

The present invention relates to high performance polymer compositions including poly(aryl ether sulfone) polymers, poly(aryl ether ketone) polymers, and an impact modifier, the polymer compositions exhibiting improved impact strength and chemical resistance.

BACKGROUND

Nowadays, mobile electronic devices, such as mobile phones, personal digital assistants (PDAs), laptop computers, MP3 players and so on, are in widespread use around the world. Mobile electronic devices are getting smaller and lighter for even more portability and convenience, while at the same time are becoming increasingly capable of performing more advanced functions and services, both due to the development of the devices and the network systems.

For the sake of convenience it is often desirable that these devices are small and lightweight; however, they still need to possess a certain structural strength, so that they are not damaged by normal handling and occasional drops. Thus, usually built into such devices are structural parts whose primary function is to provide strength and/or rigidity and/or impact resistance to the device, and possibly also provide mounting places for various internal components of the device and/or part or all of the mobile electronic device case (outer housing). While in the past, low density metals such as magnesium or aluminum were the materials of choice for such structural parts, synthetic resins have progressively at least partially replaced such metals for reasons of cost reduction, design flexibility, weight reduction, and aesthetic properties. Another problem associated to the use of metals in electronic devices is that they are not transparent to radiofrequencies; therefore, an electronic device cannot be covered with a metal. Plastic parts of electronic devices are hence made of materials that are easy to process into various and complex shapes, are able to withstand the rigors of frequent use, including outstanding impact resistance, and which can meet challenging aesthetic demands while not interfering with their intended operability.

Nevertheless, in certain cases not all the structural parts of mobile electronic devices can be replaced with plastic materials and metal/synthetic resins assemblies are often encountered. In such cases, metal parts, e.g. aluminum parts and/or aluminum/plastic composite parts present in mobile devices are submitted generally to anodization, i.e. to electro chemical processes whose aim is to build an oxide layer on the aluminum surface, notably through the use of aggressive chemicals. In view of the fact that anodization is performed on parts already comprising/assembled into polymeric elements, the polymeric materials must be highly resistant to aggressive acids.

An additional requirement for plastics materials used in mobile electronics part is that they are resistant to consumer chemicals and staining agents that often come into contact with them, in particular with the housings. Typical consumer chemicals and staining agents include: lotions (hand lotions, sunscreen lotions, etc.), makeup (such as lipstick, lip gloss, lip liner, lip plumper, lip balm, foundation, powder, blush), food (olive oil, coffee, red wine, mustard, ketchup and tomato sauce), dyes and pigments (such as those found in dyed textiles and leather used for the manufacture of portable electronic devices housings). In contact with these staining agents, the portable electronic devices housings maybe easily stained: anti-stain properties are hence desired for maintaining good aesthetic appearance of said devices, in particular when they are white or have bright or clear colors.

Exposure to consumer chemicals can lead to premature failure and/or environmental stress cracking of the part if the chemical resistance of the plastic material is not sufficient.

In addition, polymeric materials should possess excellent impact resistance for use in electronic devices; however, the addition of coloring agents such as titanium dioxide ($TiO_2$) may in some instances result in decreased toughness.

There is therefore the need to provide plastic materials which, in addition to possessing high impact resistance and good aesthetic properties, exhibit high chemical resistance.

SUMMARY OF THE INVENTION

Exemplary embodiments are directed to polymer compositions including at least one poly(aryl ether sulfone) (PAES) polymer, at least one poly(aryl ether ketone) (PAEK) polymer, and at least one impact modifier (IM). The polymer composition may optionally include at least one aromatic polycarbonate (PC) and/or titanium dioxide ($TiO_2$). The polymer composition is particularly suitable for use in mobile electronic devices.

Exemplary embodiments are directed to a polymer composition including at least one poly(aryl ether sulfone) (PAES) polymer, at least one poly(aryl ether ketone) (PAEK) polymer, and at least one impact modifier (IM).

The poly(aryl ether sulfone) (PAES) polymer may include repeat units represented by the formula (A):

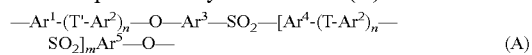

$$-Ar^1-(T'-Ar^2)_n-O-Ar^3-SO_2-[Ar^4-(T-Ar^2)_n-SO_2]_m Ar^5-O- \quad (A)$$

where $Ar^1$, $Ar^2$, $Ar^3$, $Ar^4$, and $Ar^5$, equal to or different from each other and at each occurrence, are independently an aromatic mono- or polynuclear group; T and T', equal to or different from each other and at each occurrence, are independently a bond or a divalent group optionally including one or more than one heteroatom; and n and m, equal to or different from each other, are independently zero or an integer from 1 to 5.

$Ar^1$, $Ar^2$, $Ar^3$, $Ar^4$ and $Ar^5$ may be equal or different from each other and may be represented by a formula selected from following group of formulae:

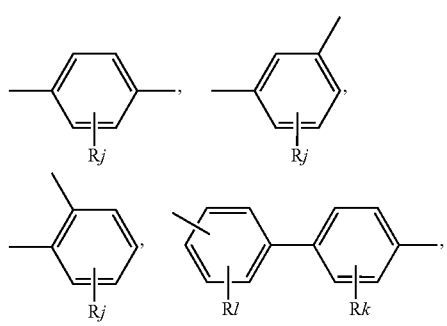

-continued

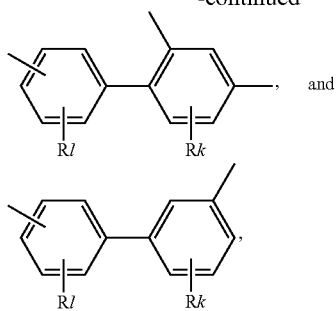

where each R is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and where j, k and l, equal or different from each other, are independently 0, 1, 2, 3 or 4.

In some embodiments, the poly(aryl ether sulfone) (PAES) polymer includes repeat units selected from the group of formulae:

(C)

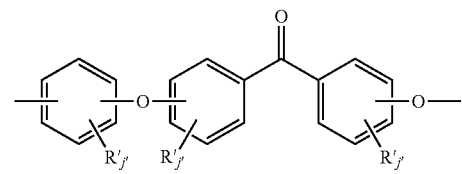

(D)

(E)

where each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; j' is zero or is an integer from 0 to 4; and T and T', equal to or different from each other, is selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R^aC=CR^b-$, where each $R^a$ and $R^b$, independently of one another, is a hydrogen or a $C_1$-$C_{12}$-alkyl, $C_1$-$C_{12}$-alkoxy, or $C_6$-$C_{18}$-aryl group; $-(CH_2)_n-$ and $-(CF_2)_n-$ with n being an integer from 1 to 6; an aliphatic divalent group, linear or branched, of up to 6 carbon atoms; and combinations thereof.

The poly(aryl ether sulfone) (PAES) may include repeat units selected from the group consisting of those of formulae:

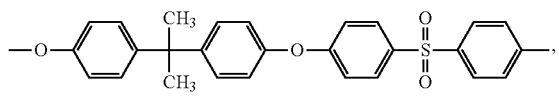

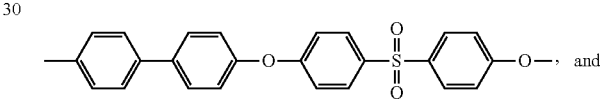

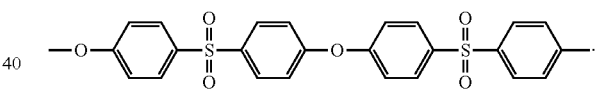

Preferably, more than 50 mol % of repeat units of the poly(aryl ether sulfone) (PAES) are recurring units of formula:

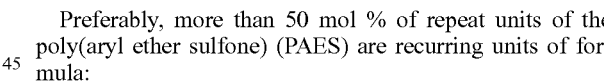

According to exemplary embodiments, more than 50% by moles of recurring units of the at least one poly(aryl ether ketone) (PAEK) are recurring units ($R_{PAEK}$) selected from group consisting of formulae (J-A) to (J-P):

(J-A)

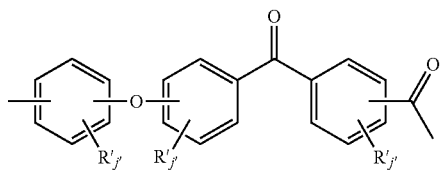

(J-B)

-continued
(J-C)
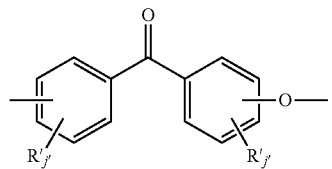
(J-D)
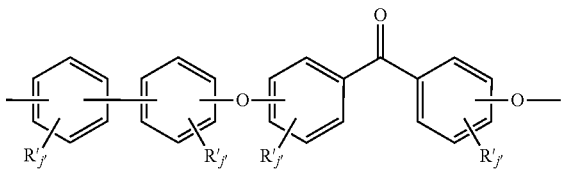
(J-E)
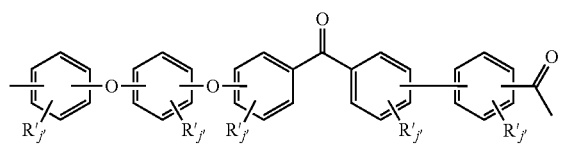
(J-F)
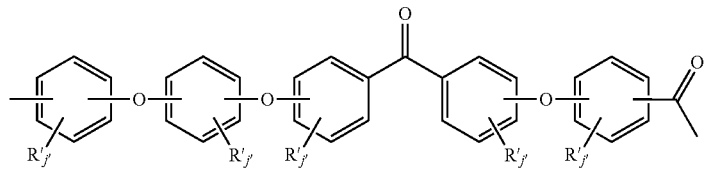
(J-G)
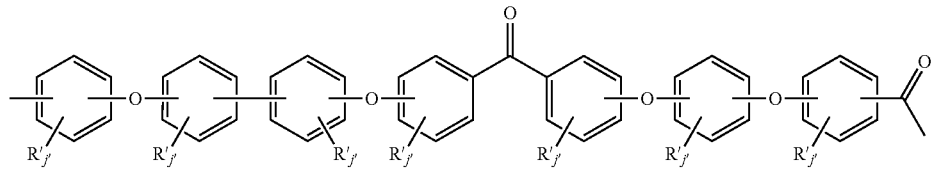
(J-H)
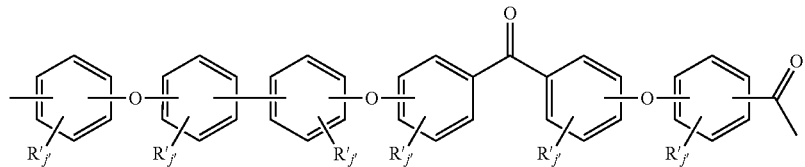
(J-I)
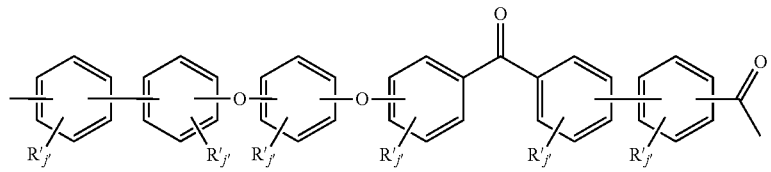
(J-J)
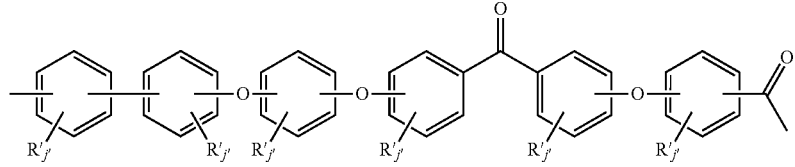
(J-K)
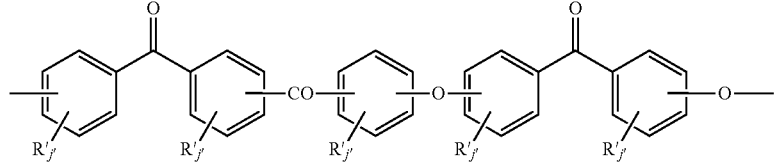
(J-L)

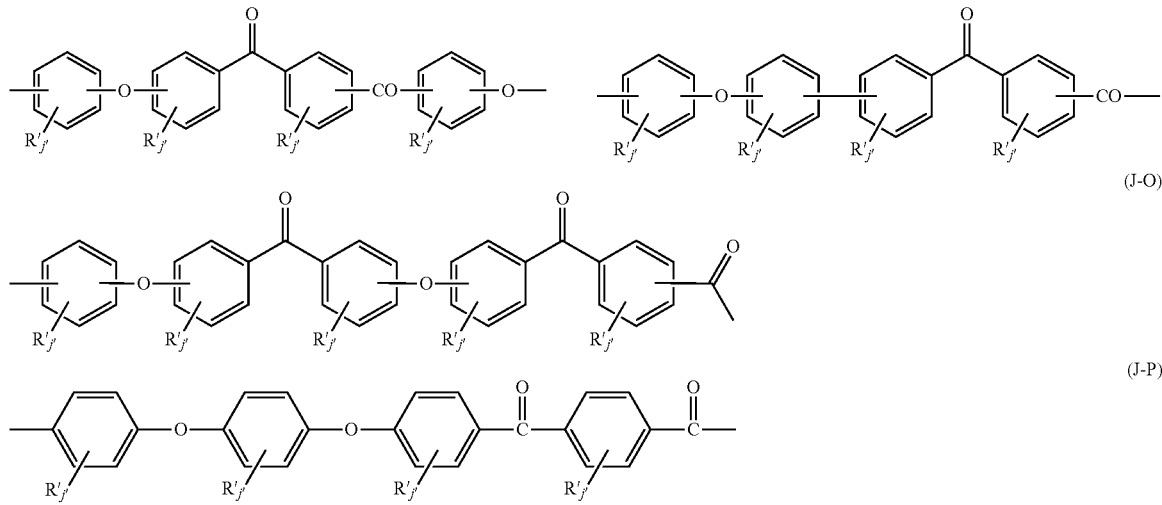

where each of R', equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and j is zero or an integer ranging from 1 to 4.

Preferably, the recurring units ($R_{PAEK}$) are selected from the group consisting of those of formulae (J'-A) to (J'-P) herein below:

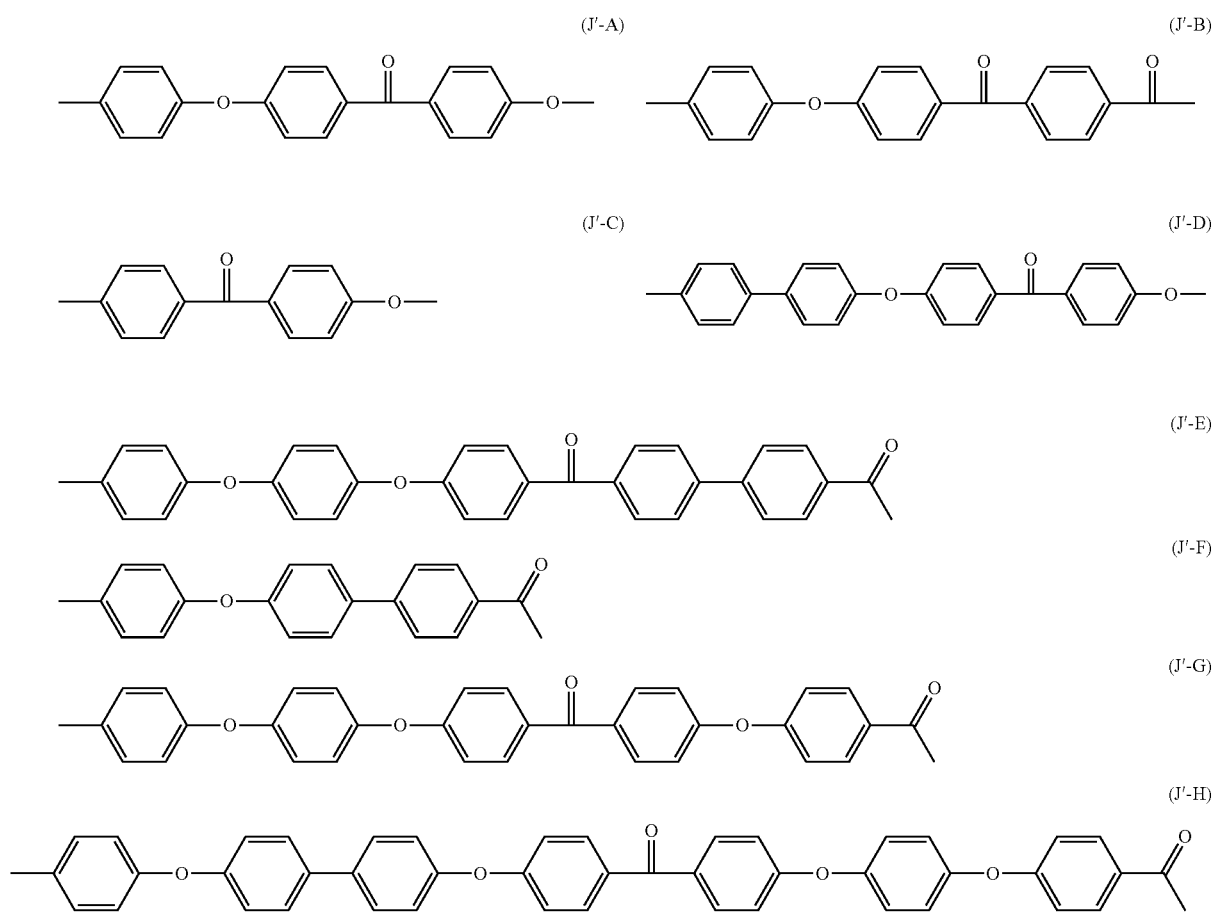

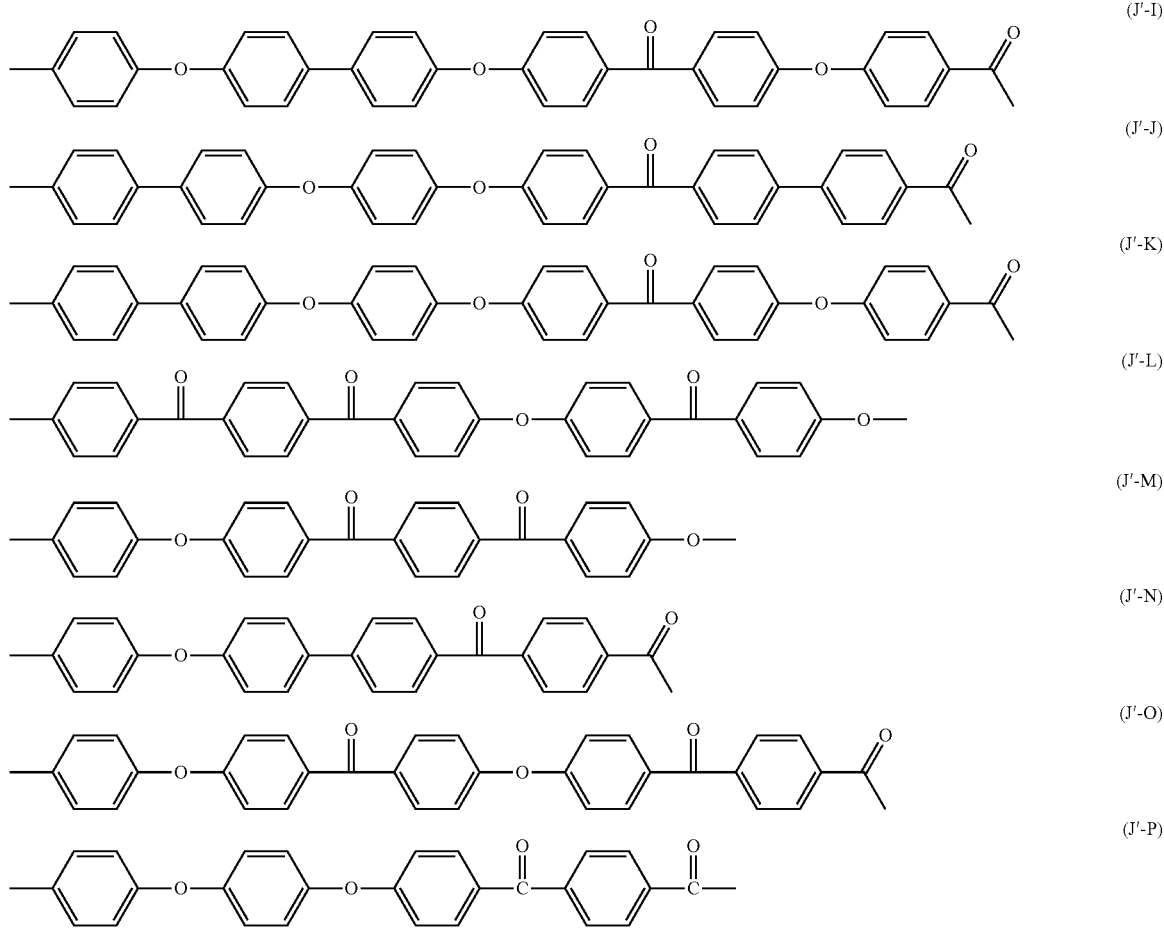

Preferably, the at least one poly(aryl ether ketone) (PAEK) polymer is polyetheretherketone (PEEK).

In some embodiments, the at least one impact modifier (IM) comprises an acrylic elastomeric copolymer.

The impact modifier (IM) may be selected from the following copolymers:

(i) elastomeric copolymers having glass transition temperature below 25° C., when measured according to according to ASTM D 3418, and comprising recurring units derived from one or more than one acrylic monomer selected from the group consisting of alkyl(meth)acrylates and acrylonitrile; and (ii) core-shell elastomers, including a central core and a shell at least partially surrounding the core, said core and said shell having different monomeric composition, and at least one of them being of elastomeric nature with a glass transition temperature below 25° C., when measured according to according to ASTM D 3418, and at least one of them comprising recurring units derived from one or more than one acrylic monomer selected from the group consisting of alkyl(meth)acrylates and acrylonitrile.

According to exemplary embodiments, the polymer composition additionally includes a polycarbonate polymer comprising recurring units ($R_{pc}$) represented by the following formula (IX):

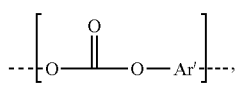

where Ar' is represented by the following formula (XII)

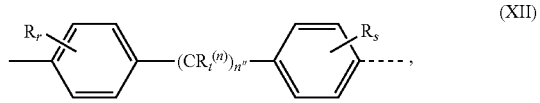

and where: each $R_t^{(n)}$ is independently selected from a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, or any combination thereof; n" is an integer ranging from 1 to 20; and t is an integer ranging from 0 to 2.

The polymer composition may also include titanium dioxide ($TiO_2$).

In some embodiments, the at least one poly(aryl ether sulfone) (PAES) polymer is present in an amount ranging from about 40 wt. % to about 99 wt. % of the combined weight of the PAES and the PAEK.

Exemplary embodiments include a shaped article comprising the polymer composition as described herein.

Exemplary embodiments also include a mobile electronic device comprising at least one structural part comprising the polymer composition as described herein.

The polymer composition may exhibit a combination of a notched-Izod impact not less than about 200 J/m, a Sunscreen Test critical strain (as described below) greater than or equal to 2.0%, and a CIE color L* of at least 91.0.

DETAILED DESCRIPTION OF PREFERRED EMBODIMENTS

Exemplary embodiments include a polymer composition comprising at least one poly(aryl ether sulfone) (PAES) polymer, where the poly(aryl ether sulfone) (PAES) is preferably polyphenylsulfone (PPSU), at least one polyaryletherketone (PAEK), where the polyaryletherketone (PAEK) is preferably polyetheretherketone (PEEK), and at least one impact modifier (IM).

Optionally, the polymer composition may include at least one polycarbonate (PC). The polymer composition may also optionally include titanium dioxide ($TiO_2$).

For the sake of clarity, throughout the present application:
the term "halogen" includes fluorine, chlorine, bromine and iodine, unless indicated otherwise;
the term "method" is used as synonym of process and vice-versa;
the adjective "aromatic" denotes any mono- or polynuclear cyclic group (or moiety) having a number of t electrons equal to 4n+2, where n is 0 or any positive integer; an aromatic group (or moiety) can be an aryl and arylene groups (or moiety) moieties.
an "aryl group" is a hydrocarbon monovalent group consisting of one core composed of one benzenic ring or of a plurality of benzenic rings fused together by sharing two or more neighboring ring carbon atoms, and of one end. Non limitative examples of aryl groups are phenyl, naphthyl, anthryl, phenanthryl, tetracenyl, triphenylyl, pyrenyl, and perylenyl groups. The end of an aryl group is a free electron of a carbon atom contained in a (or the) benzenic ring of the aryl group, where an hydrogen atom linked to said carbon atom has been removed. The end of an aryl group is capable of forming a linkage with another chemical group.
an "arylene group" is a hydrocarbon divalent group consisting of one core composed of one benzenic ring or of a plurality of benzenic rings fused together by sharing two or more neighboring ring carbon atoms, and of two ends. Non limitative examples of arylene groups are phenylenes, naphthylenes, anthrylenes, phenanthrylenes, tetracenylenes, triphenylylenes, pyrenylenes, and perylenylenes. An end of an arylene group is a free electron of a carbon atom contained in a (or the) benzenic ring of the arylene group, where an hydrogen atom linked to said carbon atom has been removed. Each end of an arylene group is capable of forming a linkage with another chemical group.
by "mobile electronic device" is meant an electronic device that is designed to be conveniently transported and used in various locations. Representative examples of portable electronic devices include mobile telephones, personal digital assistants, laptop computers, tablet computers, radios, cameras and camera accessories, watches, calculators, music players, global positioning system receivers, portable games, hard drives and other electronic storage devices, and the like.
by "structural part of a mobile electronic device" is meant any structural part including the external structural parts of the mobile electronic device such as the housing, but also the internal structural parts that may often not be visible, that is they may be in the interior of the mobile electronic device, not normally visible in the configuration in which the mobile electronic device is normally used (although they may be visible if the mobile electronic device is disassembled).

The structural part may be in any shape so that it performs its desired function. For example it may be a full or partial "frame" around the periphery of the mobile electronic device, it may in the form of one or more separate beams and/or a number of beams in the form of a latticework, or any combination of these. It may have formed into it items such as mounting holes or other fastening devices such as snap fit connectors between itself and other items of the mobile electronic device such as circuit boards, microphones, speakers, displays, batteries, covers, housings, electrical or electronic connectors, hinges, antennas, switches, and switchpads. Mobile electronic devices in which the present structural parts are useful include cell phones, personal digital assistants (PDAs), music storage and listening devices, portable DVD players, electrical multimeters, mobile electronic game consoles, mobile personal computers (such as notebook computers, etc.).

The Poly(Aryl Ether Sulfone)

For the purpose of the present invention, the expressions "poly(aryl ether sulfone)" and "PAES" are intended to denote any polymer of which at least 50 mol % of the recurring units are recurring units ($R_{PS}$) of one or more formulae containing at least one arylene group, at least one ether group (—O—) and at least one sulfone group [—S($=O)_2$—].

In the PAES as above detailed preferably more than 60%, more preferably more than 80%, still more preferably more than 90% moles of the recurring units are recurring units ($R_{PS}$). Still, it is generally preferred that substantially all recurring units of the PAES are recurring units ($R_{PS}$).

The arylene group of the PAES may be aromatic radicals comprising from 6 to 36 carbon atoms, which are optionally substituted by at least one substituent selected from the group consisting of halogen, alkyl, alkenyl, alkynyl, aryl, arylalkyl, nitro, cyano, alkoxy, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium.

The recurring units ($R_{PS}$) are advantageously recurring units of formula (A) as shown below:

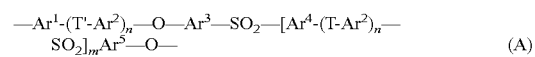

(A)

where:
$Ar^1$, $Ar^2$, $Ar^3$, $Ar^4$, and $Ar^5$, equal to or different from each other and at each occurrence, are independently an aromatic mono- or polynuclear group;
T and T', equal to or different from each other and at each occurrence, is independently a bond or a divalent group optionally comprising one or more than one heteroatom;
n and m, equal to or different from each other, are independently zero or an integer of 1 to 5;

Preferably, $Ar^1$, $Ar^2$, $Ar^3$, $Ar^4$ and $Ar^5$ are equal or different from each other and are aromatic moieties preferably selected from the group consisting of those complying with following formulae:

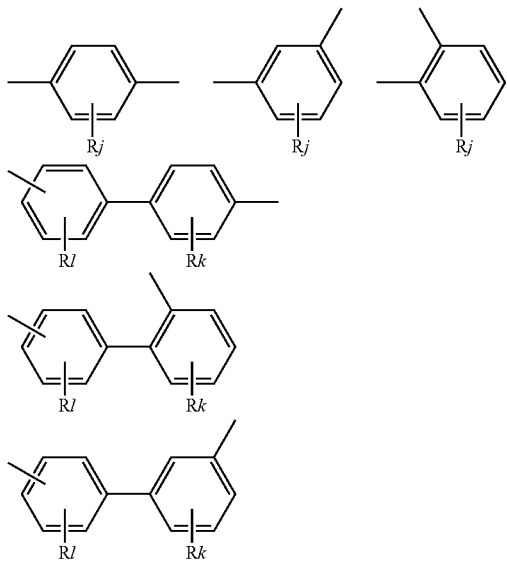

wherein each R is independently selected from the group consisting of: hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and j, k and l equal or different from each other, are independently 0, 1, 2, 3 or 4.

$Ar^2$ may further be selected from the group consisting of fused benzenic rings such as naphthylenes (and in particular 2,6-naphthylene), anthrylenes (and in particular 2,6-anthrylene) and phenanthrylenes (and in particular 2,7-phenanthrylene), naphthacenylenes and pyrenylenes groups; an aromatic carbocyclic system comprising from 5 to 24 atoms, at least one of which is a heteroatom, such as pyridines, benzimidazoles, quinolines, etc. The hetero atom is often chosen from N, O, Si, P and S. It is more often chosen from N, O and S.

Preferably, T and T' of formula (A), equal to or different from each other, are selected from the group consisting of a bond, $-CH_2-$; $-O-$; $-SO_2-$; $-S-$; $-C(O)-$; $-C(CH_3)_2-$; $-C(CF_3)_2-$; $-C(=CCl_2)-$; $-C(CH_3)(CH_2CH_2COOH)-$; $-N=N-$; $-R^aC=CR^b-$; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; $-(CH_2)_n-$ and $-(CF_2)_n-$ with n=integer from 1 to 6, or an aliphatic divalent group, linear or branched, of up to 6 carbon atoms; and mixtures thereof.

Recurring units ($R_{PS}$) can be notably selected from the group consisting of those of formulae (B) to (E) herein below:

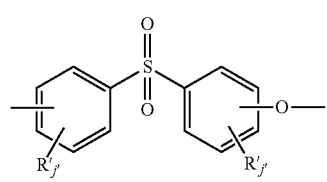

(B)

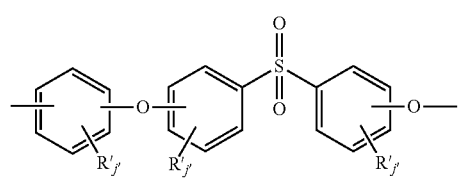

(C)

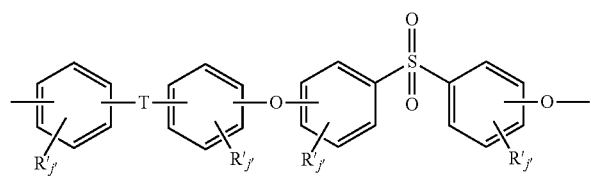

(D)

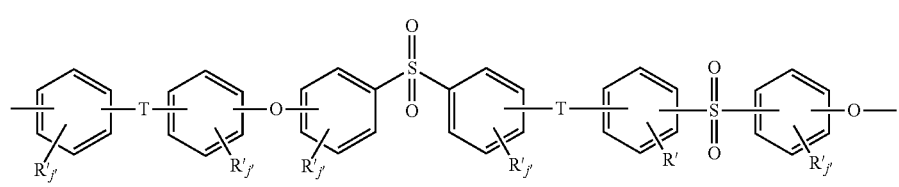

(E)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T', equal to or different from each other, is selected from the group consisting of a bond, —$CH_2$—; —O—; —$SO_2$—; —S—; —C(O)—; —$C(CH_3)_2$—; —$C(CF_3)_2$—; —C(=$CCl_2$)—; —$C(CH_3)(CH_2CH_2COOH)$—; —N=N—; —$R^aC$=$CR^b$—; where each $R^a$ and $R^b$; independently of one another, is a hydrogen or a $C_1$-$C_{12}$-alkyl, $C_1$-$C_{12}$-alkoxy, or $C_6$-$C_{18}$-aryl group; —$(CH_2)_n$— and —$(CF_2)_n$— with n being an integer from 1 to 6, or an aliphatic divalent group, linear or branched, of up to 6 carbon atoms; and mixtures thereof.

As detailed below, the PAES include poly(biphenyl ether sulfone) (e.g., polyphenylsulfone (PPSU)), polyethersulfone (PESU), a polyetherethersulfone (PEES) or polysulfone (i.e., bisphenol A polysulfone) (PSU).

For the purpose of the present invention, a poly(biphenyl ether sulfone) is intended to denote any polymer of which at least 50 mol % of the recurring units are recurring units ($R_{PSa}$) of one or more formulae containing at least one ether group (—O—), at least one sulfone group [—S(=O)$_2$—] and at least two groups (G*) chosen from phenylene, naphthylenes (such as 2,6-naphthylene), anthrylenes (such as 2,6-anthrylene) and phenanthrylenes (such as 2,7-phenanthrylene), naphthacenylenes and pyrenylenes, each of said groups (G*) being joined to at least one group (G*) different from itself, directly by at least one single bond and, optionally in addition, by at most one methylene group. Accordingly, groups (G*) may thus be joined together to form notably biphenylene groups such as p-biphenylene, 1,2'-binaphthylene groups, triphenylene groups such as p-triphenylene and fluorenylene groups (i.e. divalent groups derived from fluorene).

The recurring units ($R_{PSa}$) are advantageously recurring units of formula (A), as defined above, with the proviso that at least one $Ar^1$ through $Ar^5$ is an aromatic moiety preferably selected from the group consisting of those complying with following formulae:

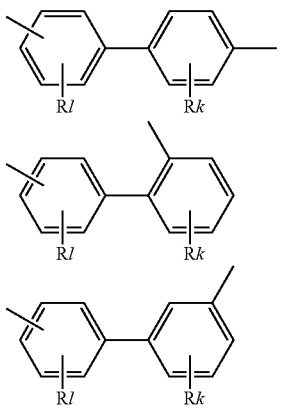

wherein R is independently selected from the group consisting of:
hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and k and l equal or different from each other, are independently 0, 1, 2, 3 or 4.

The definitions and preferences described above for T, T', $Ar^1$, $Ar^2$, $Ar^3$, $Ar^4$, $Ar^5$, n and m equally apply here.

In certain embodiments, recurring units ($R_{PSa}$) are preferably chosen from formulae (F) to (H) herein below:

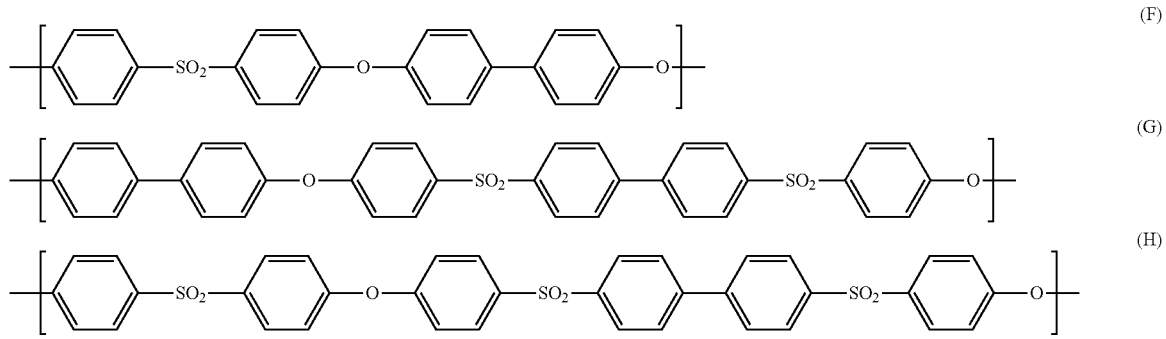

and mixtures thereof.

Therefore, in certain preferred embodiments, the PAES is a polyphenylsulfone (PPSU).

For the purpose of the present invention, a polyphenylsulfone (PPSU) is intended to denote any polymer of which more than 50 mol % of the recurring units are substituted or unsubstituted (preferably unsubstituted) recurring units ($R_{PSa}$) of formula (F). Preferably more than 75 mol %, preferably more than 85 mol %, preferably more than 95 mol %, preferably more than 99 mol % of the recurring units of the poly(biphenyl ether sulfone) are recurring units ($R_{PSa}$).

PPSU can be prepared by known methods and is notably available as RADEL® PPSU from Solvay Specialty Polymers USA, L.L.C.

In certain other preferred embodiments, the PAES is a polyethersulfone, polyetherethersulfone or a bisphenol A polysulfone.

For the purpose of the present invention, a polyethersulfone (PESU) is intended to denote any polymer of which at least 50 mol % of the recurring units are recurring units ($R_{PSb}$) of formula (I-1):

(I-1)

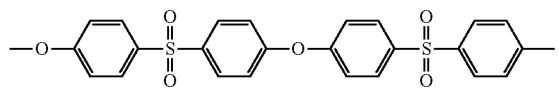

(I-3)

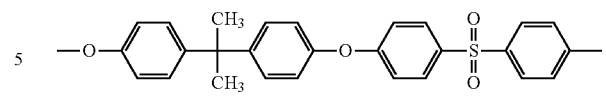

Preferably more than 75 wt. %, preferably more than 85 wt. %, preferably more than 95 wt. %, preferably more than 99 wt. % of the recurring units of the PESU are recurring units ($R_{PSb}$) of formula (I-1). Most preferably all the recurring units of the PESU are recurring units ($R_{PSb}$) of formula (I-1).

PESU can be prepared by known methods and is notably available as VERADEL® PESU from Solvay Specialty Polymers USA, L.L.C.

For the purpose of the present invention, a polyetherethersulfone (PEES) is intended to denote any polymer of which at least 50 mol % of the recurring units are recurring units ($R_{PSc}$) of formula (I-2):

(I-2)

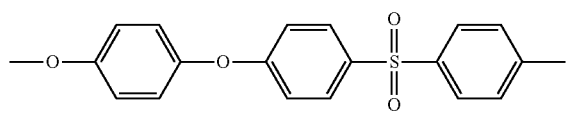

Preferably more than 75 wt. %, preferably more than 85 wt. %, preferably more than 95 wt. %, preferably more than 99 wt. % of the recurring units ($R_{PSc}$) of the PEES are recurring units of formula (I-2). Most preferably all the recurring units of the PEES are recurring units ($R_{PSc}$) of formula (I-2).

For the purpose of the present invention, a bisphenol A polysulfone (PSU) is intended to denote any polymer of which at least 50 mol % of the recurring units are recurring units ($R_{PSd}$) of formula (I-3)

Preferably more than 75 wt. %, preferably more than 85 wt. %, preferably more than 95 wt. %, preferably more than 99 wt. % of the recurring units of the PSU are recurring units ($R_{PSd}$) of formula (I-3). Most preferably all the recurring units of the PSU are recurring units ($R_{PSd}$) of formula (I-3).

PSU can be prepared by known methods and is notably available as UDEL® PSU from Solvay Specialty Polymers USA, L.L.C.

Excellent results were obtained when the poly(aryl ether sulfone) (PAES) was selected from the group consisting of PPSU, PESU, PSU or a mixture thereof. Most preferably, the PAES is PPSU.

In some embodiments, the PAES (preferably PPSU) represents about 30% to about 94%, preferably about 40 wt. % to about 90 wt. %, preferably about 50 wt. % to about 85 wt. %, preferably about 55 wt. % to about 80 wt. %, preferably about 60 wt. % to about 75 wt. %, preferably about 65 wt. % to about 70 wt. % of the combined weight of the PAES, the PAEK, and the impact modifier (IM).

A person of skill in the art will recognize additional concentration ranges within the explicitly disclosed ranges are contemplated and within the scope of the present disclosure.

The Poly(Aryl Ether Ketone)

The term "polyaryletherketone (PAEK)" is intended to denote for the purpose of the present invention any polymer, comprising recurring units, more than 50% moles of said recurring units are recurring units ($R_{PAEK}$) comprising a Ar—C(=O)—Ar' group, with Ar and Ar', equal to or different from each other, being aromatic groups. The recurring units ($R_{PAEK}$) are generally selected from the group consisting of formulae (J-A) to (J-P), herein below:

(J-A)

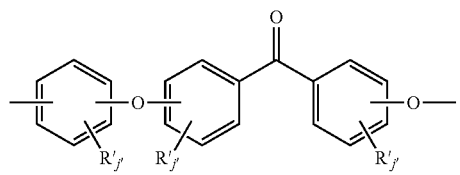

(J-B)

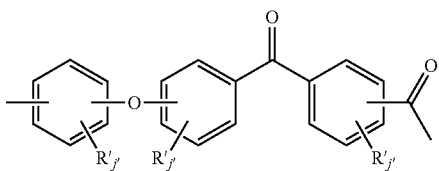

(J-C)

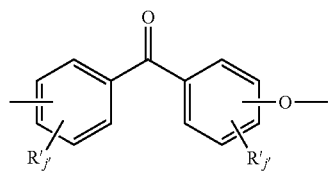

(J-D)

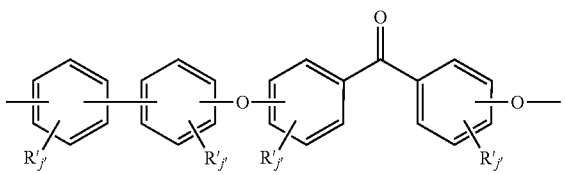

(J-E)

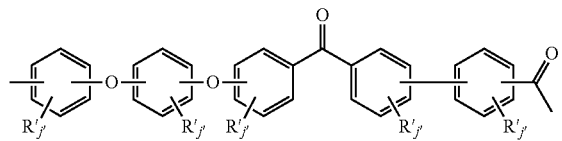

(J-F)

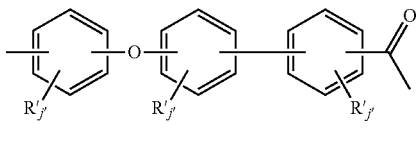

(J-G)
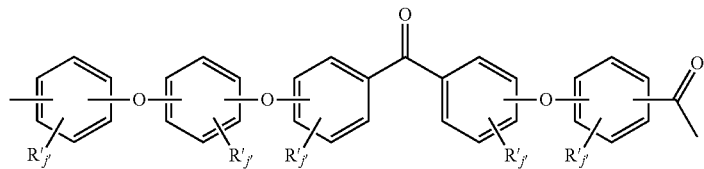
(J-H)
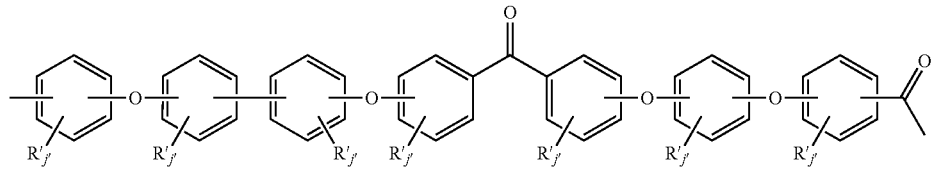
(J-I)
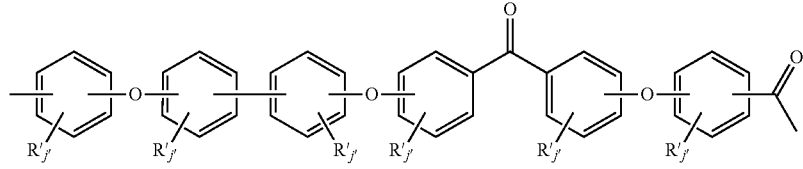
(J-J)
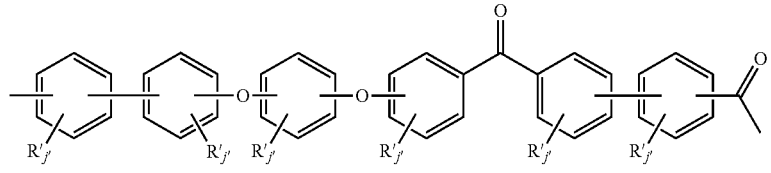
(J-K)
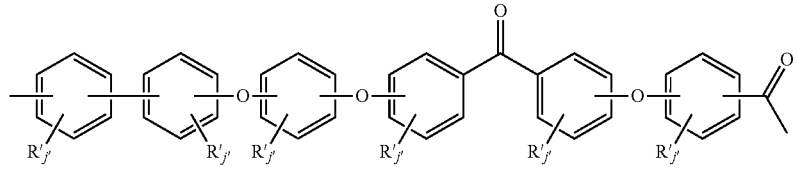
(J-L)
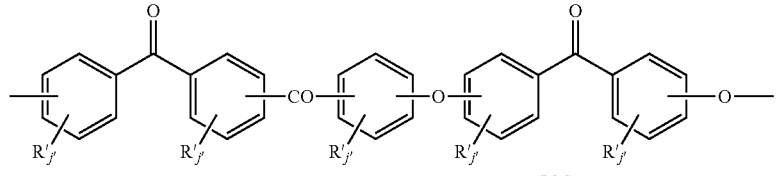
(J-M) (J-N)
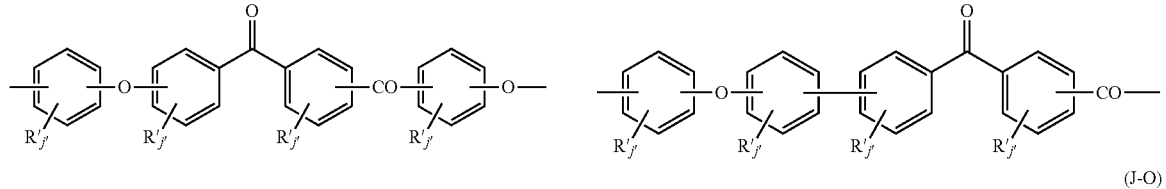
(J-O)
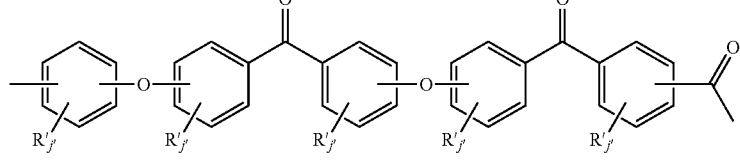
(J-P)
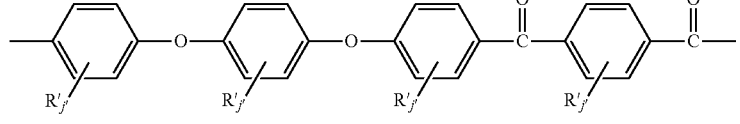

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

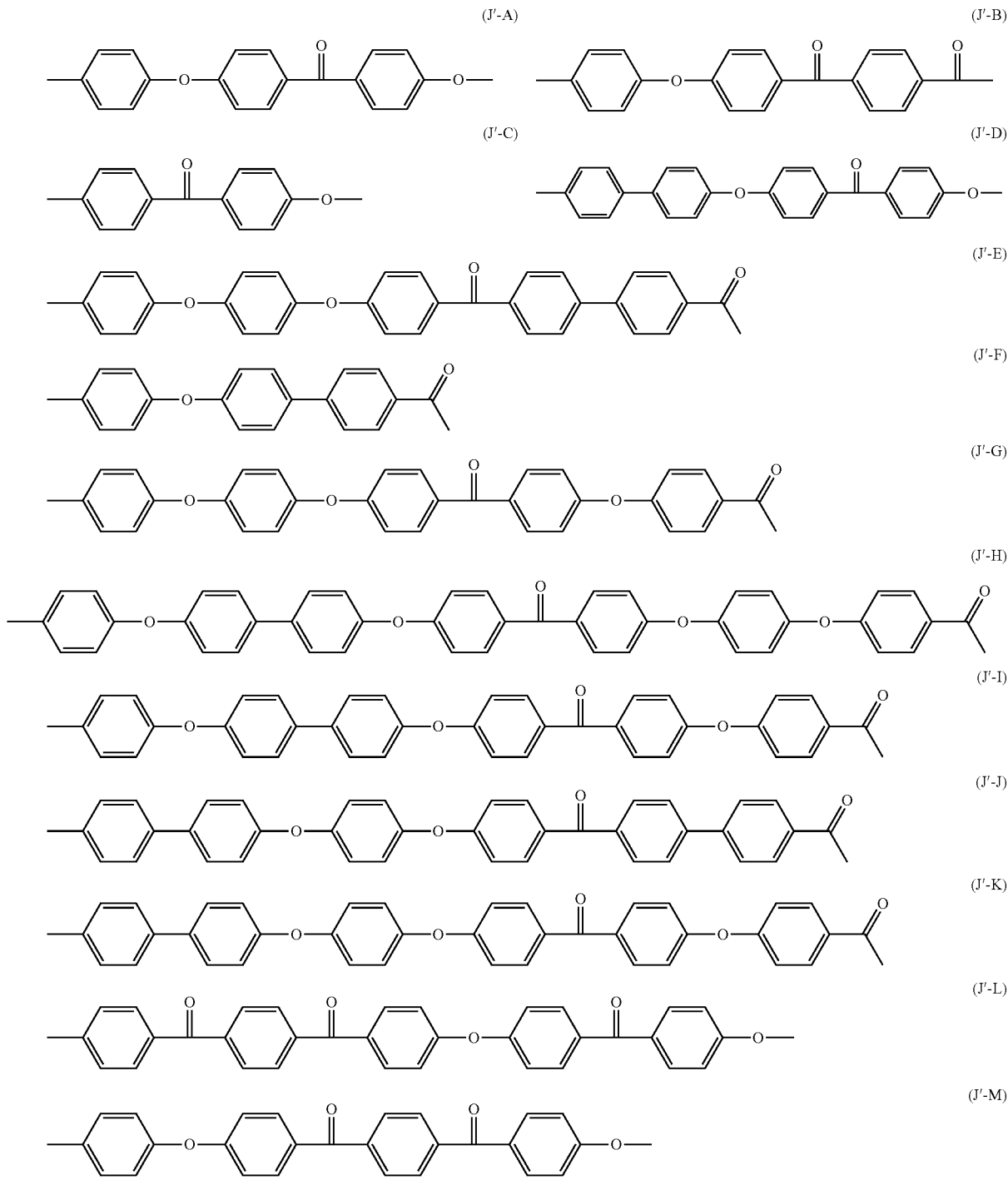

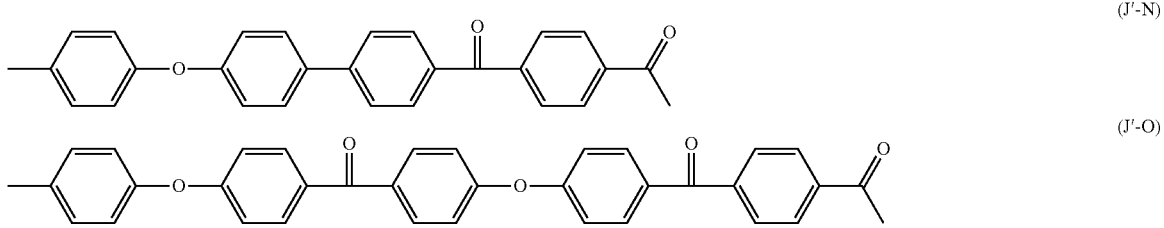

Polyaryletherketones (PAEK) are generally crystalline aromatic polymers, readily available from a variety of commercial sources. The polyaryletherketones (PAEK) have preferably reduced viscosities in the range of from about 0.8 to about 1.8 dl/g as measured in concentrated sulfuric acid at 25° C. and at atmospheric pressure.

In a preferred embodiment of the invention, at least 50% moles of the recurring units of polyaryletherketones (PAEK) are recurring units (J'-A). Preferably at least 60% moles, more preferably at least 70% moles, still more preferably at least 80% moles and most preferably at least 90% moles of the recurring units of polyaryletherketones (PAEK) are recurring units (J'-A). Excellent results were obtained when the polyaryletherketones (PAEK) contained no recurring unit other than recurring units (J'-A).

In another preferred embodiment of the invention, at least 50% moles of the recurring units of polyaryletherketones (PAEK) are recurring units (J'-B). Preferably at least 60% moles, more preferably at least 70% moles, still more preferably at least 80% moles and most preferably at least 90% moles of the recurring units of polyaryletherketones (PAEK) are recurring units (J'-B). Excellent results were obtained when the polyaryletherketones (PAEK) contained no recurring unit other than recurring units (J'-B).

In yet another preferred embodiment of the invention, at least 50% moles of the recurring units of polyaryletherketones (PAEK) are recurring units (J'-C). Preferably at least 60% moles, more preferably at least 70% moles, still more preferably at least 80% moles and most preferably at least 90% moles of the recurring units of polyaryletherketones (PAEK) are recurring units (J'-C). Excellent results were obtained when the polyaryletherketones (PAEK) contained no recurring unit other than recurring units (J'-C).

Most preferably, the polyaryletherketone (PAEK) of the polymer composition (C) is polyetheretherketone (PEEK). Excellent results may be obtained using KETASPIRE® commercially available from Solvay Specialty Polymers USA, LLC, or Victrex® 150P PEEK commercially available from Victrex PLC.

In some embodiments, the polyaryletherketone (PAEK) represents about 1% to about 57%, preferably about 5% to about 50%, preferably about 10% to about 40%, preferably about 15% to about 30%, preferably about 20% to about 25%, of the combined weight of the PAES, the PAEK, and the impact modifier (IM).

A person of skill in the art will recognize additional concentration ranges within the explicitly disclosed ranges are contemplated and within the scope of the present disclosure.

The Impact Modifier (IM)

For the purposes of the present description, the expression "impact modifier" denotes any material that is able to improve the resistance to deformation or breaking of another material.

In the polymer composition, impact modifier (IM) is typically selected from at least one of:
 a block copolymer comprising styrene units and rubber monomer units [impact modifier (IM-1)]; and
 an acrylic elastomeric copolymer [impact modifier (IM-2)]

Impact modifier (IM-1) may have a linear structure of the A-B-A block type (i.e. (styrene/rubber/styrene), a branched structure of the type (A-B)n (styrene rubber), a diblock structure of the type A-B (styrene rubber), or a combination thereof.

The rubber monomer units can be selected from butadiene or isoprene units or from a combination of ethylene with butylene and ethylene with propylene.

Impact modifiers (IM-1) comprising butadiene or isoprene units are available on the market from Kraton Polymers as Kraton® D polymers, while impact modifiers comprising ethylene/butylene or ethylene/propylene units are available on the market as Kraton® G polymers.

Advantageously, the impact modifier (IM-1) comprises styrene units and ethylene/butylene. Excellent results may be obtained using a triblock copolymer with structure of the type styrene-ethylene/butylene-styrene, available on the market with trade mark Kraton® G 1651.

Impact modifier (IM-2) is typically an elastomer selected from the following copolymers:
(i) elastomeric copolymers having a glass transition temperature below 25° C., when measured according to according to ASTM D 3418, and recurring units derived from one or more than one acrylic monomer selected from the group consisting of alkyl(meth)acrylates and acrylonitrile; and
(ii) core-shell elastomers, including a central core and a shell at least partially surrounding the core, said core and said shell having different monomeric compositions, and at least one of them being of elastomeric nature with a glass transition temperature below 25° C., when measured according to ASTM D 3418, and at least one of them comprising recurring units derived from one or more than one acrylic monomer selected from the group consisting of alkyl(meth)acrylates and acrylonitrile.

In one embodiment, impact modifier (IM-2) is an elastomeric copolymer (i) as described above. Among elastomeric copolymers (i), mention can be notably made of:
(i-A) elastomers consisting essentially of recurring units derived from acrylonitrile and recurring units derived from one or more than one monomer selected from the group consisting of ethylene, butadiene, isoprene, (meth)acrylate monomers and styrene; and
(i-B) elastomers consisting essentially of recurring units derived from one or more than one (meth)acrylate monomers and recurring units derived from one or more than one monomers selected from ethylene, butadiene, isoprene, acrylonitrile and styrene.

The expression (meth)acrylate monomers is hereby used to denote monomers of general formula $CH_2=C(RM)-C(=O)-ORMA$, wherein RM is H or $CH_3$ and RMA is a hydrocarbon group, preferably comprising one or more than one heteroatom selected from O, S, halogen, or RMA is H (i.e. providing for (meth)acrylic acid).

Hydrocarbon group RMA is not particularly limited and encompasses notably alkyl groups (and in this case the (meth)acrylate monomer will be referred to as an alkyl (meth)acrylate), hydroxy-alkylgroups, epoxy-containing hydrocarbon groups, and the like.

Non-limitative examples of (meth)acrylate monomers wherein RMA is an hydroxyl-alkylgroup are notably hydroxyethyl (meth)acrylate and hydroxypropyl (meth)acrylate isomers.

Examples of elastomers (i-B) are notably ethylene-acrylic ester-glycidyl methacrylate elastomers.

In some embodiments, impact modifier (IM-2) is a random copolymer of ethylene and glycidyl methacrylate, and/or a random terpolymer of ethylene, acrylic ester, and glycidyl methacrylate. In some embodiments, the impact modifier (IM) is not a random terpolymer of ethylene, acrylic ester, and glycidyl methacrylate.

Advantageously, impact modifier (IM-2) is an elastomer (i-B). Such elastomers are available from Arkema with trade mark Lotader®. Excellent results were obtained using Lotader® AX 8900, a random terpolymer of ethylene, acrylic ester (24% wt) and glycidyl methacrylate (8% wt).

In another embodiment, impact modifier (IM-2) is a core-shell elastomer (ii) as described above.

As said, these core-shell elastomers are provided in the form of particles having a size of generally from 0.1 μm to 5 μm, preferably from 0.1 μm to 1 μm.

According to a preferred embodiment, the core-shell elastomers are composed of an elastomeric core and of a thermoplastic shell.

The elastomeric core is generally selected from:
elastomeric diene homopolymers or copolymers, generally selected from the group consisting of isoprene or butadiene homopolymers, isoprene copolymers with at most 30 mol percent of a vinyl monomer and butadiene copolymers with at most 30 mol percent of a vinyl monomer. The vinyl monomer may be styrene, an alkyl styrene, acrylonitrile or a (meth)acrylate monomer, as above detailed, preferably an alkyl(meth)acrylate;
homopolymers of alkyl(meth)acrylate different from MMA and copolymers of said alkyl(meth)acrylate different from MMA with at most 30 mol percent of a monomer selected from another alkyl(meth)acrylate, and a vinyl monomer. Advantageously, the alkyl(meth)acrylate different from MMA is butyl acrylate. The vinyl monomer may be styrene, an alkyl styrene, acrylonitrile, butadiene or isoprene.

The elastomeric core of the core-shell copolymer may be completely or partly cross-linked.

To achieve crosslinking of the elastomeric core, a possible practice is to incorporate at least one difunctional monomer during polymerization leading to said elastomeric core; it is possible for these difunctional monomers to be selected from poly(meth)acrylic esters of polyols such as butylene di(meth)acrylate and trimethylolpropane trimethacrylate. Other suitable difunctional monomers are, for example, divinylbenzene, trivinylbenzene, vinyl acrylate and vinyl methacrylate.

The elastomeric core may also be cross-linked by introducing into it, by grafting or as comonomer during polymerization, unsaturated functional monomers such as unsaturated carboxylic acid anhydrides, unsaturated carboxylic acids and unsaturated epoxides. For example, mention may be made of maleic anhydride, (meth)acrylic acid and glycidyl methacrylate.

The thermoplastic shell can be notably any of styrene, alkyl styrene or methyl methacrylate homopolymers or copolymers containing at least 70 mol percent of one of these monomers mentioned above and at least one comonomer selected from the other monomers mentioned above, another alkyl(meth)acrylate, vinyl acetate and acrylonitrile. The shell may be functionalized by introducing therein, by grafting or as comonomer during polymerization, unsaturated functional monomers such as unsaturated carboxylic acid anhydrides, unsaturated carboxylic acids and unsaturated epoxides. As examples, mention may be made of maleic anhydride, (meth)acrylic acid and glycidyl methacrylate.

Examples of copolymers and their method of preparation are described in the following patents: U.S. Pat. Nos. 4,180,494, 3,808,180, 4,096,202, 4,260,693, 3,287,443, 3,657,391, 4,299,928, 3,985,704 and 5,773,520.

Advantageously, the core represents 70 to 90% and the shell 30 to 10% by weight of the core-shell elastomer.

As examples of a specific core-shell elastomer which can be used, mention may be made of:
(1) a core-shell elastomer which is made of:
  (i) from 25 to 95 weight percent of an acrylic rubber core:
    said core comprising from 90 to 100% wt of recurring units derived from a $C_1$-$C_6$ acrylate (preferably butyl acrylate);
    said core being possibly cross-linked with 0.1 to 5% wt of a cross-linking monomer having a plurality of addition polymerizable reactive groups, all of which polymerize at substantially same reaction rate, preferably selected from poly acrylic and poly methacrylic esters of polyols (preferably butylene diacrylate, butylene dimethacrylate, trimethylol propane trimethacrylate); di- and tri-vinyl benzene, vinyl acrylate and vinyl methacrylate; and
    said core possibly further containing 0.1 to 5% wt of a graft-linking monomer, i.e. a polyethylenically unsaturated monomer having a plurality of addition polymerizable reactive groups, at least one of which polymerizing at substantially lower rate of said reactive group, so providing a residual level of unsaturation in the elastomeric phase to enable grafting of the thermoplastic shell, said graft-linking monomer being preferably selected from allyl-group containing monomers, in particular allyl esters of ethylenically unsaturated acids (preferably allyl acrylate, allyl methacrylate, diallyl maleate, diallyl fumarate, diallyl itaconate); and
  (ii) from 75 to 5 weight percent of a thermoplastic shell, said shell consisting of a polymer comprising at least 70% weight of recurring units derived from a C1 to C4 alkyl methacrylate (preferably methyl methacrylate), possibly in combination with less than 30% wt of recurring units derived from any of styrene, acrylonitrile, alkyl acrylate, allyl methacrylate, diallyl methacrylate;
(2) a core-shell elastomer which is made of:
  (i) from 25 to 95 weight percent of a 1,3-butadiene elastomer-based core:
    said core comprising at least 70% wt of recurring units derived from 1,3-butadiene, and less than 30% wt of recurring units derived from monomers other than 1,3-butadiene, selected from the group consisting of styrene, acrylonitrile and methyl methacrylate (preferably styrene);

said core possibly comprising minor amounts (e.g. of 0.01 to 1% wt) of recurring units from one or more polyunsaturated cross-linking monomers, e.g. divinylbenzene; and (ii) from 75 to 5 weight percent of a thermoplastic shell, said shell being made of any of (k) a methyl methacrylate homopolymer, possibly modified with a minor amount (e.g. from 0.1 to 1% wt) of a cross-linking monomer, preferably selected from poly acrylic and poly methacrylic esters of polyols (preferably butylene diacrylate, butylene dimethacrylate, trimethylol propane trimethacrylate), (kk) a polymer of styrene, acrylonitrile and methylmethacrylate, and (kkk) a styrene homopolymer, possibly modified with a minor amount (e.g. from 0.1 to 1% wt) of a cross-linking monomer, preferably selected from divinylbenzene;

(3) a core-shell elastomer which comprises (j) 75 to 80 parts by weight of a core comprising at least 94% wt of recurring units derived from 1,3-butadiene, 5% wt or less of recurring units derived from styrene, and 0.5 to 1% wt percent of recurring units derived from divinylbenzene and (jj) 25 to 20 parts by weight of two shells, generally of identical weight fraction, the inner one made of polystyrene and the other outer one made of a methyl methacrylate homopolymer, possibly modified with a minor amount (e.g. from 0.1 to 1% wt) of a cross-linking monomer, preferably selected from poly acrylic and poly methacrylic esters of polyols (preferably butylene diacrylate, butylene dimethacrylate, trimethylol propane trimethacrylate).

There are also other types of core-shell copolymers such as hard/soft/hard copolymers, that is to say they have, in this order, a hard core, a soft shell and a hard shell. The hard parts may comprise the polymers of the shell of the above soft/hard copolymers and the soft part may comprise the polymers of the core of the above soft/hard copolymers. Non-limiting examples of such core-shell polymers comprise in order:

a core made of a methyl methacrylate/ethyl acrylate copolymer;

a shell made of a butyl acrylate/styrene copolymer; and a core made of a methyl methacrylate/ethyl acrylate copolymer.

There are also other types of core-shell copolymers such as hard (core)/soft/semi-hard copolymers. Compared with the previous ones, the difference stems from the "semi-hard" outer shell which comprises two shells, one being the intermediate shell and the other the outer shell. The intermediate shell is a copolymer of methyl methacrylate, styrene and at least one monomer selected from alkyl acrylates, butadiene and isoprene. The outer shell is a PMMA homopolymer or copolymer. Non-limiting examples of such copolymers comprise in order:

a core made of a methyl methacrylate/ethyl acrylate copolymer;

a shell made of a butyl acrylate/styrene copolymer;

a shell made of a methyl methacrylate/butyl acrylate/styrene copolymer; and a shell made of a methyl methacrylate/ethyl acrylate copolymer.

In some embodiments, the impact modifier (IM) is about 5 wt. % to about 30 wt. %, preferably about 5 wt. % to about 20 wt. %, preferably about 5 wt. % to about 15 wt. % of the combined weight of the PAES and the PAEK polymers.

In some embodiments, the impact modifier (IM) represents about 4.5% to about 23%, preferably about 5% to about 20%, preferably about 7.5% to about 18%, preferably about 10% to about 15% of the combined weight of the PAES, the PAEK, and the impact modifier (IM).

The polymer composition may include about 10 wt. % to about 20 wt. %, preferably about 15 wt. % of the impact modifier (IM).

A person of skill in the art will recognize additional concentration ranges within the explicitly disclosed ranges are contemplated and within the scope of the present disclosure.

The Optional Aromatic Polycarbonate (PC)

The polymer composition may optionally include one or more aromatic polycarbonate polymers (PC). As used herein, an "aromatic polycarbonate polymer" refers to any polymer in which at least 50 mol % of the recurring units are recurring units ($R_{pc}$) contain at least one arylene monomer and at least one carbonate monomer (—O—C(=O)—O—). In some embodiments, the aromatic polycarbonate polymer can have at least about 60 mol %, at least about 80 mol %, at least about 90 mol %, at least about 95 mol %, or at least about 99 mol % of the recurring unit ($R_{pc}$). A person of ordinary skill in the art will recognize additional ranges of recurring unit ($R_{pc}$) concentration within the explicitly disclosed ranges is contemplated and within the scope of the present disclosure.

In some embodiments, the recurring ($R_{pc}$) can be represented by one the following formulae:

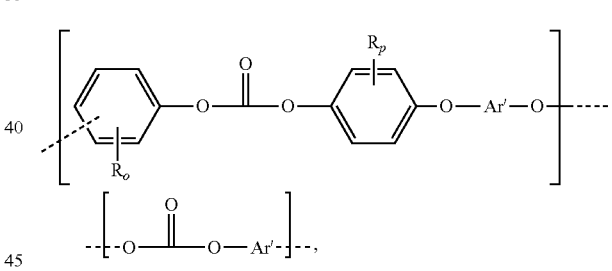

where each $R_o$ and $R_p$ are independently selected from a halogen, a $C_1$-$C_{20}$ alkyl, a $C_5$-$C_{15}$ cycloalkyl, a $C_1$-$C_{20}$ alkenyl, an alkynyl, a $C_1$-$C_{20}$ aryl, a $C_1$-$C_{20}$ alkylaryl, a $C_1$-$C_{20}$ aralkyl, an ether, a thioether, carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium; where Ar' is an aromatic mono- or polynuclear group; and (iii) where each 1 is independently an integer from 0 to 4.

In some embodiments, Ar' can be selected from a moiety containing one or more fused benzenic rings, including but not limited to naphthylenes (e.g., 2,6-naphthylene), anthrylenes (e.g., 2,6-anthrylene), phenanthrylenes (e.g., 2,7-phenanthrylene), naphthacenylenes and pyrenylenes; or a moiety containing an aromatic carbocyclic system including from 5 to 24 atoms, at least one of which is a heteroatom (e.g., pyridines, benzimidazoles, and quinolones).

The hetero atom can be N, O, Si, P or S. In some embodiments, the hetero atom can be N, O or S.

In some embodiments, Ar' can be represented by one of the following formulae:

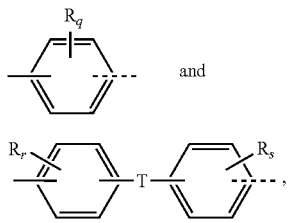

where each $R_q$, $R_r$ and $R_s$ is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, amine and a quaternary ammonium; where T is selected from a $C_1$-$C_{20}$ alkyl, a $C_5$-$C_{15}$ cycloalkyl, a $C_1$-$C_{20}$ aryl, a $C_1$-$C_{20}$ alkylaryl, a $C_1$-$C_{20}$ aralkyl, a $C_1$-$C_{20}$ alkenyl, and a halogen; and where q, r and s are independent integers from 0 to 4.

In some embodiments, the Ar' can be represented by the following:

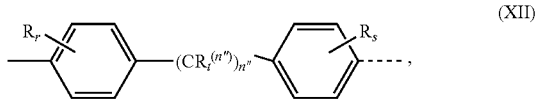

where each $R_t^{(n)}$ is independently selected from a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, or any combination thereof; where n" is an integer from 1 to 20; and where t is an integer from 0 to 2. In some such embodiments, each R can independently be a $C_1$-$C_{20}$ alkyl including, but not limited to, a methyl, an ethyl, an n-propyl; an isopropyl, or a butyl (n-, iso, sec or tert). In some embodiments, n" can be 1 and t can be 2. In some such embodiments, each $R_t$ can be a methyl group.

The aromatic polycarbonate (PC) can be free of branching or it can be branched. The aromatic polycarbonate (PC) can be semi-crystalline (it has a melting point) or amorphous (it has no melting point). In some embodiments, the aromatic polycarbonate (PC) is preferably amorphous. For example, aromatic polycarbonate (PC) of formula (VIII) can be synthesized by polycondensation of a diphenyl carbonate monomer and an aromatic diol monomer. As a further example, aromatic polycarbonate (PC) of Formula (IX) can be synthesized by the polycondensation of a phosgene monomer and an aromatic diol monomer. Desirable aromatic polycarbonate polymers (PC) and their corresponding syntheses are discussed in U.S. Published Application No. 2010/0016518 to El-Hibri et al., filed Feb. 26, 2009 and entitled "Aromatic Polycarbonate Composition," which is incorporated herein by reference in its entirety.

In addition to recurring units ($R_{pc}$), the aromatic polycarbonate (PC) can include one or more additional recurring units ($R_{pc}*$) distinct from recurring units ($R_{pc}$). Desirable recurring units ($R_{pc}*$) include, but are not limited to, those described above with respect to recurring units ($R_{pc}$). In some such embodiments, the aromatic polycarbonate (PC) may include not more than about 49 mol %, not more than about 40 mol %, not more than about 30 mol %, not more than about 20 mol %, not more than about 10 mol %, not more than about 5 mol %, or not more than about 1 mol % of the one or more additional recurring units ($R_{pc}*$). A person of skill in the art will recognize additional recurring unit ($R_{pc}*$) concentration ranges within the explicitly disclosed ranges are contemplated and within the scope of the present disclosure.

The amount of polycarbonate (PC) preferably ranges from 0 wt. % to about 40 wt. %, preferably from 0 wt. % to about 30 wt. %, preferably from 0 wt. % to about 30 wt. % based on the total weight of the PAES and PAEK polymers and the impact modifier (IM). I some embodiments, the amount of polycarbonate (PC) is at most 40 wt. %, preferably at most 35 wt. %, preferably at most 30 wt. %, preferably at most 25 wt. %, preferably at most 20 wt. % of the combined weight of the PAES and PAEK polymers and the impact modifier (IM).

In some embodiments, the amount of polycarbonate (PC) ranges from 0 to about 10 wt. %, preferably about 5% wt. % of the polymer composition.

A person of skill in the art will recognize additional concentration ranges within the explicitly disclosed ranges are contemplated and within the scope of the present disclosure.

In some embodiments, the polymer composition may include additional, distinct polycarbonate polymers. The additional, distinct polycarbonate polymers can include those polycarbonate polymers (PC) described above. In such embodiments, the weight ratio of the polycarbonate polymer to the combined weight of the polycarbonate polymer and the additional, distinct polycarbonate polymer (polycarbonate/(polycarbonate+additional polycarbonate)) is at least about 0.5, at least about 0.6, at least about 0.7, at least about 0.8, at least about 0.9, at least about 0.95, or at least about 0.99. In some embodiments, the weight ratio of the polycarbonate polymer to the combined weight of the polycarbonate polymer and the additional, distinct polycarbonate polymer can be 1. A person of ordinary skill in the art will recognize additionally weight ratio ranges within the explicitly disclosed ranges are contemplated and within the scope of the present disclosure.

In some embodiments, the polymer composition does not include an aromatic polycarbonate (PC). In some embodiments, the polymer composition includes an aromatic polycarbonate (PC) but does not include an impact modifier (IM) that is a random terpolymer of ethylene, acrylic ester, and glycidyl methacrylate.

Other Optional Ingredients

In some embodiments, the polymer composition includes titanium dioxide ($TiO_2$). The amount of titanium dioxide preferably ranges from 0 pph to about 25 pph, preferably from about 0.1 pph to about 25 pph, preferably from about 5 pph to about 20 pph, preferably from about 10 pph to about 20 pph, preferably about 15 pph.

The amount of titanium dioxide ($TiO_2$) may be at most about 25 pph, preferably at most about 20 pph, preferably at most about 20 pph, preferably at most about 15 pph.

A person of skill in the art will recognize additional concentration ranges within the explicitly disclosed ranges are contemplated and within the scope of the present disclosure.

The polymer composition may further optionally comprise additional additives such as ultraviolet light stabilizers, heat stabilizers, antioxidants, pigments, processing aids, lubricants, flame retardants, and/or conductivity additive such as carbon black and carbon nanofibrils.

The polymer composition may also further comprise other polymers such as polyetherimide, polyphenylsulfide and/or polycarbonate.

The polymer composition may further comprise flame retardants such as halogen and halogen free flame retardants.

Method of Manufacturing the Polymer Composition

The polymer composition can be manufactured by melt-mixing a poly(aryl ether sulfone) (PAES) (preferably polyphenylsulfone (PPSU), a poly(aryl ether ketone) (PAEK) (preferably a polyetheretherketone (PEEK), an impact modifier (IM), and optional ingredients such as aromatic polycarbonate (PC) and titanium dioxide ($TiO_2$) to provide a molten mixture, followed by extrusion and cooling of the molten mixture.

Exemplary embodiments also include a method of increasing the chemical resistance and/or impact strength of a composition comprising a poly(aryl ether sulfone) (PAES) and a poly(aryl ether ketone) (PAEK) by adding an impact modifier to said composition.

The polymer compositions described herein are advantageously provided in the form of pellets, which may be used in injection molding or extrusion processes known in the art.

The preparation of the polymer composition can be carried out by any known melt-mixing process that is suitable for preparing thermoplastic molding compositions. Such a process is typically carried out by heating the thermoplastic polymer above the melting temperature of the thermoplastic polymer thereby forming a melt of the thermoplastic polymer. The process for the preparation of the composition can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the polymer composition the constituting components for forming the composition are fed to the melt-mixing apparatus and melt-mixed in that apparatus. The constituting components may be fed simultaneously as a powder mixture or granule mixer, also known as dry-blend, or may be fed separately.

The structural parts of the mobile electronic devices according to the present invention are made from the polymer composition using any suitable melt-processing method. In particular, they are made by injection molding or extrusion molding. Injection molding is a preferred method.

The structural parts of the mobile electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Although the metal may adhere well to the structural parts without any special treatment, usually some well-known in the art method for improving adhesion will be used. This may range from simple abrasion of the synthetic resin surface to roughen it, addition of adhesion promotion agents, chemical etching, functionalization of the surface by exposure to plasma and/or radiation (for instance laser or UV radiation) or any combination of these. Also, some of the metal coating methods comprise at least one step where the structural part is immersed in an acid bath. More than one metal or metal alloy may be plated onto the structural parts made of the polymer composition (C), for example one metal or alloy may be plated directly onto the synthetic resin surface because of its good adhesion, and another metal or alloy may be plated on top of that because it has a higher strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the structural part may be fully or partly coated with metal. Preferably more than 50 percent of the surface area will be coated, more preferably all of the surface will be coated. In different areas of the structural part the thickness and/or the number of metal layers, and/or the composition of the metal layers may vary. The metal may be coated in patterns to efficiently improve one or more properties in certain sections of the structural part.

An aspect of the present invention is directed to mobile electronic devices comprising at least one structural part made of a polymer composition described herein, and in particular to a laptop, a mobile phone, a GPS, a tablet, personal digital assistants, portable recording devices, portable reproducing devices and portable radio receives.

Shaped Articles Comprising the Polymer Composition

The polymer compositions described herein can be used for the manufacture of formed articles, in particular parts of electronic devices, more particularly parts of portable or mobile electronic devices.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like. The at least one part of the mobile electronic device according to the present invention may be selected from a large list of articles such as fitting parts, snap fit parts, mutually moveable parts, functional elements, operating elements, tracking elements, adjustment elements, carrier elements, frame elements, switches, connectors and (internal and external) components of housing, which can be notably produced by injection molding, extrusion or other shaping technologies.

In particular, the polymer compositions described herein are very well suited for the production of housing components of mobile electronic device.

Therefore, the at least one part of the mobile electronic device according to the present invention is advantageously a component of a mobile electronic device housing. By "mobile electronic device housing" is meant one or more of the back cover, front cover, antenna housing, frame and/or backbone of a mobile electronic device. The housing may be a single component-article or, more often, may comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas. Housing components may also be designed for their aesthetic appearance and touch.

In a preferred embodiment, the mobile electronic device housing is selected from the group consisting of a mobile phone housing, a tablet housing, a laptop computer housing and a tablet computer housing. Excellent results were obtained when the part of the mobile electronic device according to the present invention was a mobile phone housing.

Methods for the Manufacture of Shaped Articles

The shaped articles obtained from (or comprising) polymer compositions described herein may be manufactured by molding techniques.

For this purpose, any standard molding technique can be used; standard techniques including shaping the polymer compositions in a molten/softened form can be advantageously applied, and include notably compression molding, extrusion molding, injection molding, transfer molding and the like.

It is nevertheless generally understood that especially when said part of the mobile electronic device possesses a complex design, the injection molding technique is the most versatile and extensively used. According to this technique, a ram or screw-type plunger is used for forcing a portion of polymer compositions in their molten state into a mold cavity, wherein the same solidified into a shape that has confirmed to the contour of the mold. Then, the mold opens and suitable means (e.g. an array of pins, sleeves, strippers, etc.) are driven forward to demold the article. Then, the mold closes and the process is repeated.

In another embodiment, the method for manufacturing a part of an electronic device includes a step of machining of a standard shaped article so as to obtain said part having different size and shape from said standard shaped article. Non limiting examples of said standard shaped articles include notably a plate, a rod, a slab and the like. Said standard shaped parts can be obtained by any processing technique, including notably extrusion or injection molding of the polymer composition.

The parts of the electronic devices according to the present invention may be coated with metal by any known methods for accomplishing that, such as vacuum deposition (including various methods of heating the metal to be deposited), electroless plating, electroplating, chemical vapor deposition, metal sputtering, and electron beam deposition. Hence, the method, as above detailed, may additionally comprise at least one additional step comprising coating at least one metal onto at least a part of the surface of the said part.

Although the metal may adhere well to the parts without any special treatment, usually some well-known in the art methods for improving adhesion can be used. This may range from simple abrasion of the surface to roughen it, addition of adhesion promotion agents, chemical etching, functionalization of the surface by exposure to plasma and/or radiation (for instance laser or UV radiation) or any combination of these.

Also, some of the metal coating methods may include at least one step where the part is immersed in an acid bath. More than one metal or metal alloy may be plated onto the parts made of the polymer composition, for example one metal or alloy may be plated directly onto the surface because of its good adhesion, and another metal or alloy may be plated on top of that because it has a greater strength and/or stiffness. Useful metals and alloys to form the metal coating include copper, nickel, iron-nickel, cobalt, cobalt-nickel, and chromium, and combinations of these in different layers. Preferred metals and alloys are copper, nickel, and iron-nickel, and nickel is more preferred. The surface of the part may be fully or partly coated with metal. In different areas of the part the thickness and/or the number of metal layers, and/or the composition of the metal layers may vary. The metal may be coated in patterns to efficiently improve one or more properties in certain sections of the part.

The part, as obtained from the method above, is generally assembled with other components in order to manufacture an electronic device, in particular a mobile electronic device.

Therefore, a further object of the invention is the manufacture of an electronic device, in particular a mobile electronic device, said method including the steps of:

a. providing as components at least a circuit board, a screen, and a battery;
b. providing at least one part made of the polymer composition, as described above;
c. assembling at least one of said components with said part or mounting at least one of said components on said part.

Chemical and Mechanical Properties of the Polymer Composition

The polymer composition may exhibit improved impact performance. While it is often desirable that mobile electronic devices (and parts thereof) be small and lightweight, excellent structural strength is highly desirable so that device will not be damaged in normal handling and occasional sudden impact (e.g. drops). Correspondingly, structural parts are generally built into mobile electronic devices that impart strength, rigidity, and/or impact resistance to the device, and possibly also provide mounting places for various internal components of the device and/or part or all of the mobile electronic device case (e.g., outer housing), while ensuring electrical insulation/electrical shielding among components. In some embodiments, the polymer composition may have a notched izod impact resistance of at least 200 Joules/meter ("J/m"), preferably at least 250 J/m. In some aspects, the polymer composition has a notched izod impact resistance ranging from about 200 J/m to about 250 J/m, preferably ranging from about 200 J/m to about 300 J/m. A person of ordinary skill in the art will recognize additional notched izod impact resistance ranges within the explicitly disclosed ranges are contemplated and within the scope of the present disclosure. Impact resistance can be measured using a notched izod impact test according the ASTM D256 standard, as described further in the Examples.

The polymer composition may also exhibit improved chemical and staining resistance. In some application settings, at least a portion of a plastic component of a mobile electronic device can be exposed to environment external to the mobile electronic device (e.g. a mobile phone or a tablet computer). In such settings, the exposed portion of the plastic component may come into contact with the external environment. Agents in the external environment that may come into contact with the exposed portion of the plastic component include, but are not limited to, acidic agents and staining agents.

Typical staining agents include, but are not limited to consumer products such as, for example, makeup, (e.g., lipstick, lip gloss, lip liner, lip plumper, lip balm, foundation, powder, and blush), artificial or natural colorants (e.g., those found in soft drinks, coffee, red wine, mustard, ketchup and tomato sauce), dyes and pigments (e.g., those found in dyed textiles and leather, used for the manufacture of portable electronic devices housings). The exposed portion of the plastic component could be easily stained when contacted with a staining agent and, correspondingly, plastic components having anti-stain properties are desirable, especially in the case where the plastic component is colored in shades of white or is clear colored.

The present polymer composition may have a chemical resistance to consumer products as measured by no visible defects after exposure to the consumer products after 24 hours at 65° C./90% RH and strain >2%.

The resistance of a device component to polar organic chemicals can be measured by its resistance to sunscreen lotion, which generally represents one of the harshest consumer chemicals a device component is expected to endure in its intended application setting. In particular, sunscreen lotion generally contains a spectrum of ultraviolet absorbing chemicals that can be highly aggressive to plastic. A representative sunscreen may include at least 1.8 vol. % avobenzone (1-(4-methoxyphenyl)-3-(4-tert-butylphenyl)-1,3-propanedione), at least 7 vol. % homosalate (3,3,5-trimethylcyclohexyl salicylate) and at least 5 vol. % octocrylene (2-ethylhexyl 2-cyano-3,3-diphenylacrylate). An example of the aforementioned sunscreen is commercially available under the trade name Banana Boat® Sport Performance® (SPF 30) from Edgewell (St. Louis, Mo.). The chemical resistance of a polymer composition can be measured as the lowest strain necessary to visually observe cracking or crazing in a molded sample of the polymer composition after the sample is exposed to aggressive chemicals and aged in a controlled environment ("critical strain"). In general, the higher the critical strain, the higher the chemical resistance of the polymer composition to polar organic agents. In some aspects, the polymer composition has a Sunscreen Test strain to fail % (i.e. critical strain) of greater than or equal to 1.7%, preferably greater than or equal to about 1.8%, preferably greater than or equal to about 1.9%, preferably greater than or equal to about 2.0%. The measurement of critical strain is described further in the Examples below.

The polymer compositions also have desirable colorability. In some embodiments, the polymer composition can have a CIE L* value of ranging from about 90.0 to about 94.0, preferably about 91.0 to about 94.0, preferably about 92.0 to about 94.0, preferably about 93.0 to about 94.0. A person of ordinary skill in the art will recognize additional L* ranges within the explicitly disclosed ranges are contemplated and within the scope of the present disclosure.

The polymer composition may also exhibit anodization resistance. Metal parts (e.g. aluminum parts) or metal-plastic composite parts (e.g., aluminum-plastic parts) present in mobile electronic devices generally undergo anodization treatment. Anodization treatment can include electro-chemical processes where the aim is to build an oxide layer on the metal surface, generally through the use of aggressive chemicals. Correspondingly, polymeric materials exhibiting excellent anodization resistance are desirable in application settings in which anodization is performed on mobile electronic parts already containing or assembled to polymeric elements. Anodization resistance can be measured as the respective differences in tensile strength, tensile modulus, and elongation at break of an as-molded sample of a polymer composition and a molded sample that has been exposed to 70 wt. % sulfuric acid at 23° C. The measurement of the anodization resistance is further described in the Examples.

In some embodiments, the polymer composition may exhibit a relative difference in tensile strength of not more than about 3 MPa, preferably not more than about 2 MPa, preferably not more a than about 1 MPa, preferably not more than about 0 MPa.

The polymer composition may exhibit a relative difference in tensile modulus of not more than about 0.10 GPa.

The polymer composition may exhibit a relative difference in tensile elongation at break of not more than about 5%, preferably not more than about 4%, preferably not more than about 3%, preferably not more than about 2%.

A person of ordinary skill in the art will recognize additional ranges of relative tensile strength, tensile modulus, and tensile elongation at break within the explicitly disclosed ranges is contemplated and within the scope of the present disclosure.

In exemplary embodiments, the polymer composition exhibits a combination of a notched-Izod impact not less than about 200 J/m, a Sunscreen Test strain to fail greater than or equal to 2.0%, and a CIE color L* ranging from 91.0 to 94.0.

Should the disclosure of any patents, patent applications, and publications which are incorporated herein by reference conflict with the description of the present application to the extent that it may render a term unclear, the present description shall take precedence.

The invention will be herein after illustrated in greater detail in the following section by means of non-limiting examples.

EXAMPLES

Materials

The following materials were used to prepare the Examples and Comparative Examples:

Polyphenylsulfone (PPSU)—Grade: Radel® R-5100 LC1100 available from Solvay Specialty Polymers USA, LLC (melt flow rate (MFR) range of 16-22 g/10 min as measured according to ASTM D-1238 at a temperature of 365° C. and 5.0 kg weight).

Polycarbonate (PC)—Grade: Makrolon® 3108 available from Bayer Materials Science, Inc. This is a PC having a specification melt flow range of 4.9 to 8.4 g/10 min as measured according to ASTM D1238 at a temperature of 300° C. with a 1.2 kg weight.

Polyetheretherketone (PEEK)—Victrex 150P from Victrex PLC. This is a PEEK having a melt viscosity of 130 Pa·s as measured according to ISO 11443 at 400° C.

Impact Modifier A—Lotader® AX8900 is a random copolymer of ethylene and glycidyl methacrylate (8 wt. %) available from Arkema.

Impact Modifier B—Lotader® AX8840 is a random terpolymer of ethylene, acrylic ester (24 wt. %) and glycidyl methacrylate (8 wt. %) available from Arkema.

Titanium Dioxide (TiO$_2$)—Grade: TiPure R105 available from Chemours.

Blends Preparation

Each formulation was subjected to melt compounding using a 26 mm diameter Coperion® ZSK-26 co-rotating partially intermeshing twin screw extruder having an L/D ratio of 48:1. The barrel sections 2 through 12 and the die were heated to set point temperatures as follows:

Barrels 2-6: 360° C.
Barrels 7-12: 360° C.
Die: 360° C.

In each case, the resins and additives were fed at barrel section 1 using a gravimetric feeder at throughput rates in the range 30-40 lb/hr. The extruder was operated at screw speeds of around 200 RPM. Vacuum was applied at barrel zone 10 with a vacuum level of about 27 inches of mercury. A single-hole die was used for all the compounds and the molten polymer strand exiting the die was cooled in a water trough and then cut in a pelletizer to form pellets approximately 3.0 mm in length by 2.7 mm in diameter.

Injection Molding

Injection molding was performed on the example formulations for the purpose of producing 3.2 mm (0.125 in) thick ASTM tensile and flexural specimens for mechanical property testing. Type I tensile ASTM specimens and 5 in×0.5 in×0.125 in flexural specimens were injection molded using the following approximate temperature conditions on the barrel and mold:

Rear zone: 680° F.
Middle zone: 680° F.
Front zone: 700° F.
Nozzle: 700° F.
Mold: 285° F.

Testing

Mechanical properties were tested for all the formulations using injection molded 0.125 inch thick ASTM test specimens which consisted of 1) Type I tensile bars, 2) 5 in×0.5 in×0.125 in flexural bars, and 3) 4 in×4 in×0.125 in plaques for the instrumented impact (Dynatup) testing. The following ASTM test methods were employed in evaluating all compositions:

D-638: Tensile properties: tensile strength at break, tensile modulus and tensile elongation at break tested by applying Banana Boat® SPF30 broad spectrum sunscreen cream to ASTM flexural bars that have been mounted onto parabolic flexural jigs (Bergen jigs) that vary the applied strain on the plastic material from near zero to 2.0% (Sunscreen Test). These stressed assemblies were aged in a controlled humidity environmental chamber at a temperature of 65° C. and relative humidity of 90% for a duration of 24 hours, after which the assemblies were removed from the chamber and the flexural bars mounted on the strain jigs were inspected for any signs of cracking or crazing. Critical strain to failure was recorded as the lowest strain level on the parabola on which cracking or crazing was observed.

The second chemical resistance test conducted was an acid bath immersion test in which Type I ASTM tensile specimens were immersed in 70 wt. % sulfuric acid at 23° C., after which the specimens were removed, washed with water, then tested for their tensile properties. The tensile properties before and after this acid exposure served as an indicator of the material's ability to withstand the anodizing steps applied in mobile phone manufacturing steps when the phone is comprised of a combination of metal and plastic parts, where the plastic material has to undergo exposure to the chemical conditions of the anodizing baths—typically comprising various strong acidic environments.

Results

The property test data associated with all the examples and comparative examples are shown in Table 1.

TABLE 1

| | Example No. | | | | | |
|---|---|---|---|---|---|---|
| | CE1 | CE2 | E1 | E2 | E3 | E4 |
| Victrex ® 150P PEEK | 19.6 | 19.6 | 16.7 | 16.7 | 15.65 | 15.65 |
| Zinc Oxide | 0.1 | 0.1 | 0.1 | 0.1 | 0.1 | 0.1 |
| PPSU, Radel ® R-5100 LC 1100 | 80.3 | 80.3 | 68.2 | 68.2 | 64.25 | 64.25 |
| Elastomer, Lotader ® AX8840 | — | — | 15 | — | 15 | — |
| Elastomer, Lotader ® AX8900 | — | — | — | 15 | — | 15 |
| PC, Macrolon ® 3108 | — | — | — | — | 5 | 5 |
| $TiO_2$, TiPure ® R-105 (pph) | 25 | 15 | 15 | 15 | 15 | 15 |
| Tensile strength (MPa) | 78 | 79 | 50 | 48 | 45 | 46 |
| Tensile Modulus (GPa) | 2.5 | 2.6 | 1.6 | 1.5 | 1.5 | 1.6 |
| Tensile Elongation at Break (%) | 36 | 60 | 23 | 23 | 16 | 20 |
| Notched Izod Impact (J/m) | 140 | 140 | 256 | 258 | 85 | 205 |
| Sunscreen test - Strain to Break (%) | 1.5 | 1.2 | >2.0 | >2.0 | >2.0 | >2.0 |
| Tensile Properties Post Acid Treatment | | | | | | |
| Tensile Strength (MPa) | 77 | 77 | 50 | 48 | 47 | 49 |
| Tensile Modulus (GPa) | 2.6 | 2.6 | 1.6 | 1.6 | 1.6 | 1.6 |
| Tensile Elongation at Break (%) | 41 | 50 | 27 | 25 | 21 | 18 |
| Color | | | | | | |
| CIE Color, L* | 92.7 | 91.9 | 91.7 | 92.4 | 93.27 | 93.0 |
| CIE Color, a* | −0.11 | −0.04 | 0.13 | −0.05 | 0.08 | 0.02 |
| CIE Color, b* | 4.3 | 4.9 | 7.31 | 6.43 | 5.92 | 6.02 |

D-256: Notched Izod impact resistance

As-molded color of each formulation was measured to assess the whiteness of the formulation. The color was measured according to the CIE L-a-b coordinates standard where the L* coordinate represents the lightness (black to white) scale, the a* coordinate represents the green-red chromaticity and the b* scale represents the blue-yellow chromaticity. The whiteness of the material is considered acceptable if the L* value is greater than 90.0 and the combined absolute values of the chromaticity coordinates a* and b* are less than 4.0 units.

The chemical resistance of the formulations was tested in two ways. Chemical resistance against sunscreen lotion was It was expected that the impact modifiers (IM) would not survive the processing temperature of PPSU and PEEK; however, as shown in Table 1, the polymer compositions of Examples E1, E2, and E3 surprisingly and unexpectedly exhibited significantly improved notched izod impact strength.

In addition, the addition of an impact modifier (IM) was surprisingly and unexpectedly found to increase resistance of the polymer compositions to chemical exposure in the Sunscreen Test. While the PPSU/PEEK blends of the Comparative Examples failed after 24 hours of exposure at 65° C./90% RH to sunscreen lotion, the blends of the Examples (containing an impact modifier (IM)) did not exhibit any change even at strain >2%.

Moreover, the tensile properties of the polymer compositions of the Examples remained essentially unchanged after 24 hours immersion in 70 wt. % sulfuric acid at 23° C.

The invention claimed is:

1. A polymer composition comprising:
   at least one poly(aryl ether sulfone) (PAES) polymer,
   at least one poly(aryl ether ketone) (PAEK) polymer, and
   at least one impact modifier (IM).

2. The polymer composition of claim 1, wherein the poly(aryl ether sulfone) (PAES) polymer comprises repeat units represented by formula (A):

$$—Ar^1\text{-}(T'\text{-}Ar^2)_n—O—Ar^3—SO_2—[Ar^4\text{-}(T\text{-}Ar^2)_n—SO_2]_m—Ar^5—O—$$ (A)

wherein:
$Ar^1$, $Ar^2$, $Ar^3$, $Ar^4$, and $Ar^5$, equal to or different from each other and at each occurrence, are independently an aromatic mono- or polynuclear group;

T and T', equal to or different from each other and at each occurrence, are independently a bond or a divalent group optionally including one or more than one heteroatom; and n and m, equal to or different from each other, are independently zero or an integer from 1 to 5.

3. The polymer composition of claim 2, wherein $Ar^1$, $Ar^2$, $Ar^3$, $Ar^4$ and $Ar^5$ are equal or different from each other and are represented by a formula selected from following group of formulae:

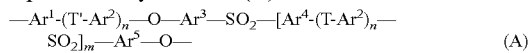

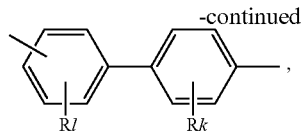

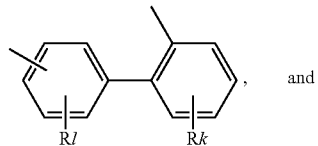

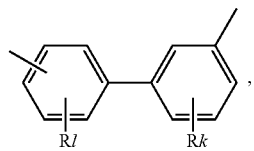

wherein each R is independently selected from the group consisting of hydrogen, halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium and where j, k and l, equal or different from each other, are independently 0, 1, 2, 3 or 4.

4. The polymer composition of claim 1, wherein the poly(aryl ether sulfone) (PAES) polymer comprises repeat units selected from the group of formulae:

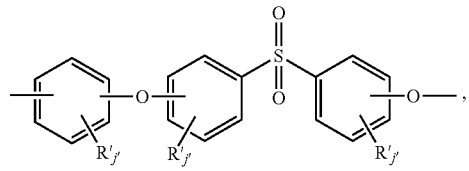
(C)

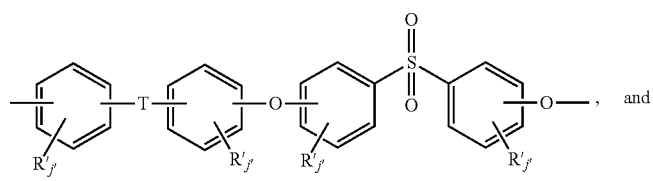
(D)

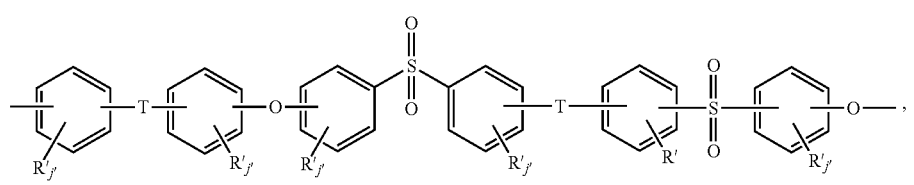
(E)

wherein,
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4; and

T and T', equal to or different from each other, is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$^a$C=CR$^b$—, where each R$^a$ and R$^b$, independently of one another, is a hydrogen or a C$_1$-C$_{12}$-alkyl, C$_1$-C$_{12}$-alkoxy, or C$_6$-C$_{18}$-aryl group; —(CH$_2$)$_n$— and —(CF$_2$)$_n$— with n being an integer from 1 to 6; an aliphatic divalent group, linear or branched, of up to 6 carbon atoms; and combinations thereof.

5. The polymer composition of claim 1, wherein the poly(aryl ether sulfone) (PAES) polymer comprises repeat units selected from the group consisting of those of formulae:

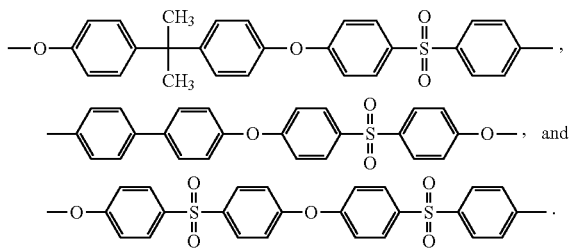

6. The polymer composition of claim 1, wherein more than 50 mol. % of repeat units of the poly(aryl ether sulfone) (PAES) polymer are recurring units of formula:

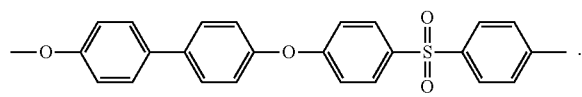

7. The polymer composition of claim 1, wherein more than 50% by moles of recurring units of the at least one poly(aryl ether ketone) (PAEK) polymer are recurring units (R$_{PAEK}$) selected from group consisting of formulae (J-A) to (J-P):

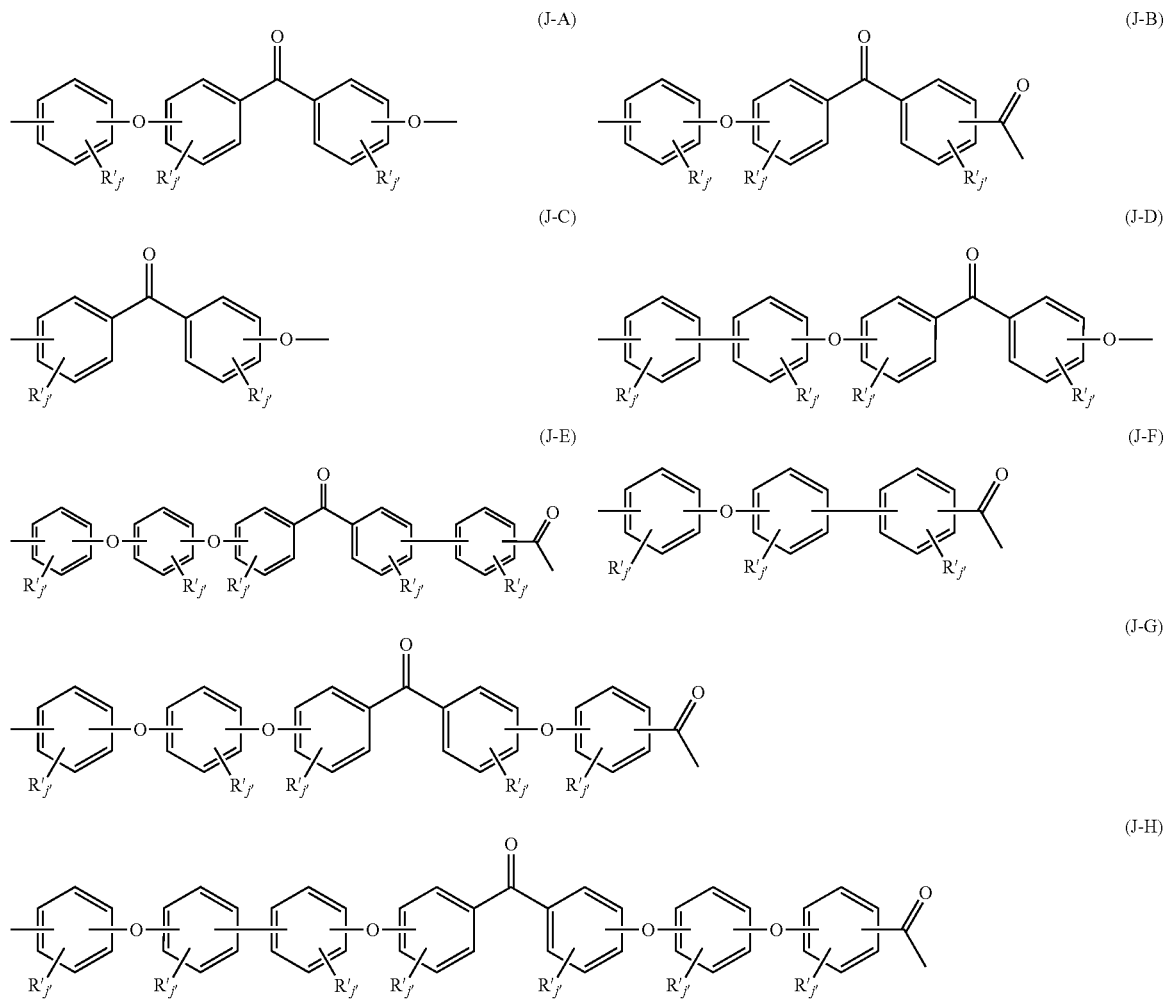

-continued

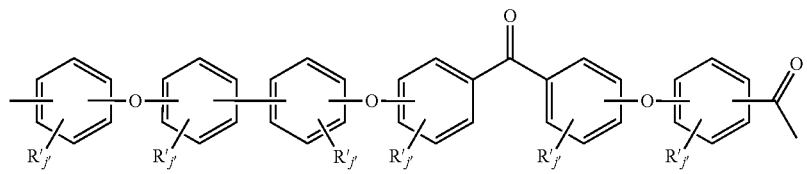
(J-I)

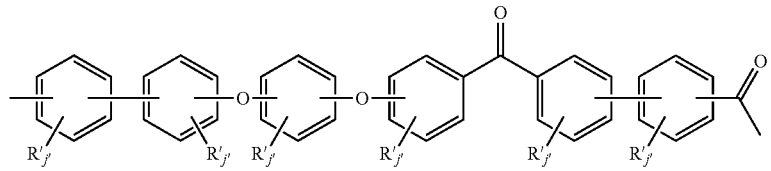
(J-J)

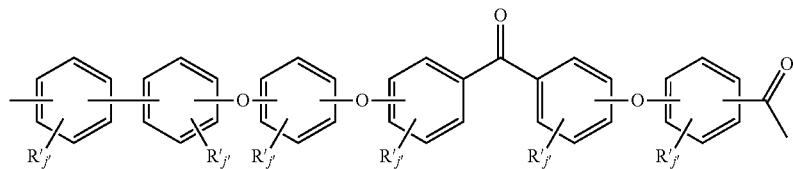
(J-K)

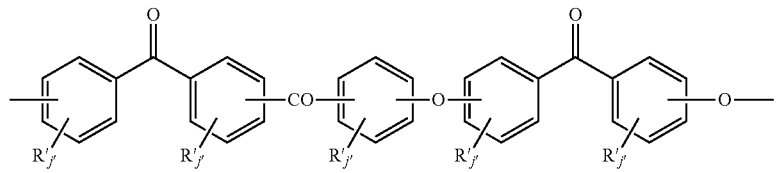
(J-L)

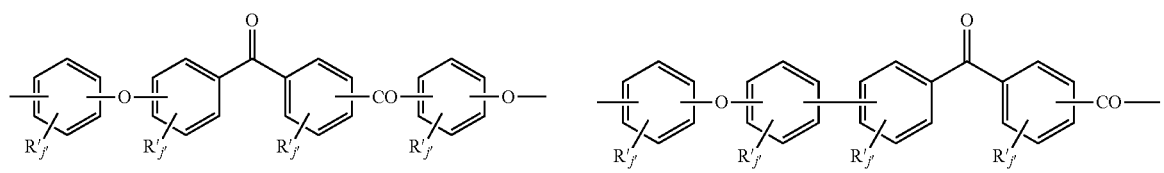
(J-M) (J-N)

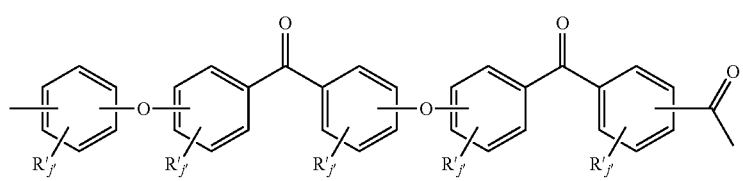
(J-O)

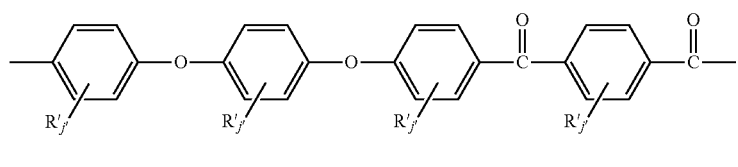
(J-P)

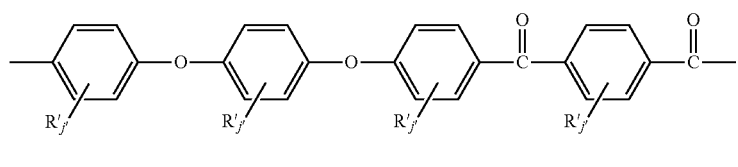

wherein:
each of R', equal to or different from each other, is selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium, and j is zero or an integer ranging from 1 to 4.

8. The polymer composition of claim 7, wherein the recurring units ($R_{PAEK}$) are selected from the group consisting of those of formulae (J'-A) to (J'-P):
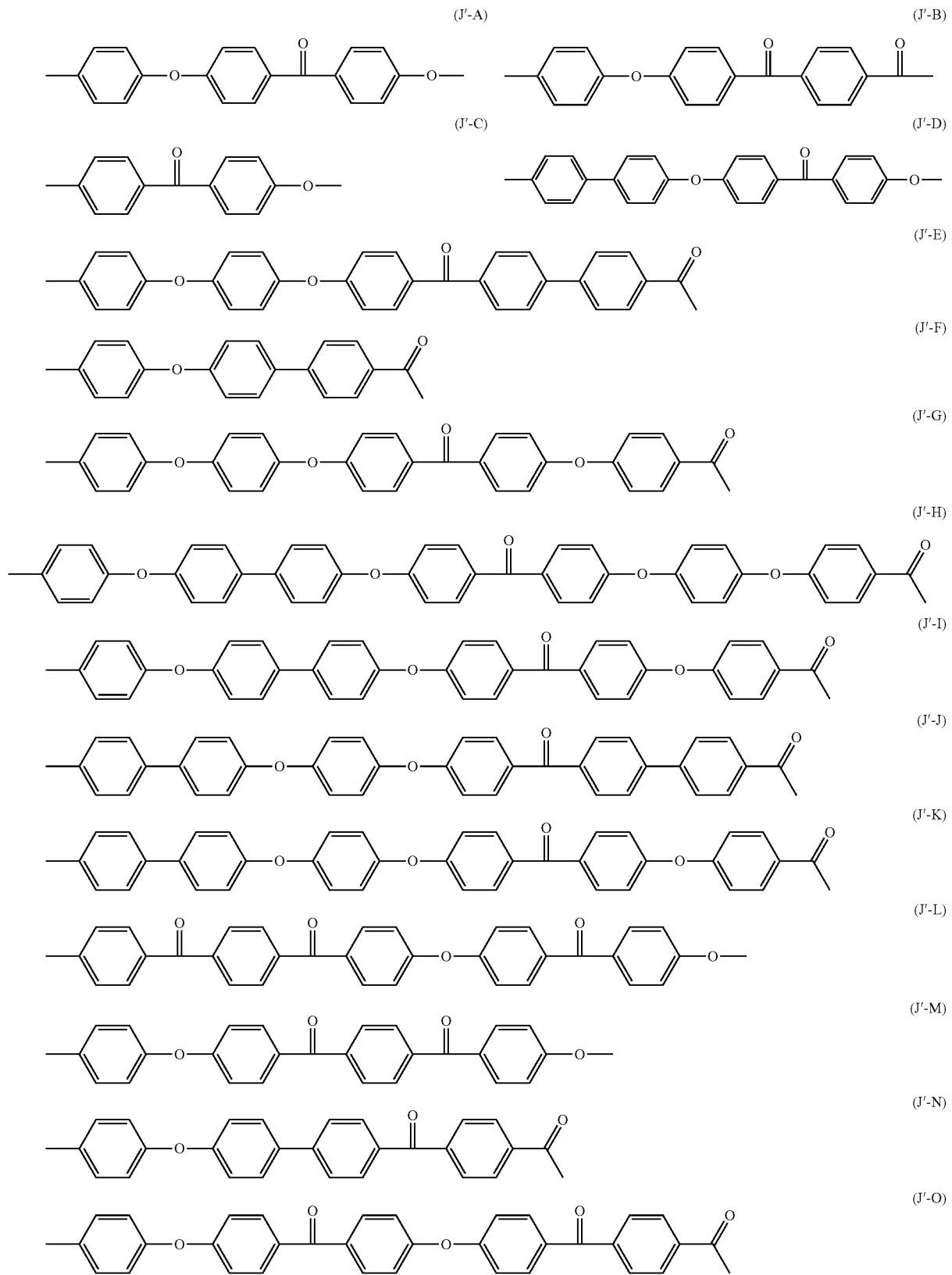

-continued

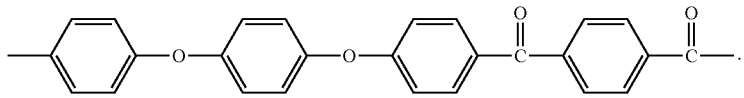
(J'-P)

9. The polymer composition of claim 1, wherein the at least one poly(aryl ether ketone) (PAEK) polymer is polyetheretherketone (PEEK).

10. The polymer composition of claim 1, wherein the at least one impact modifier (IM) comprises an acrylic elastomeric copolymer.

11. The polymer composition of claim 1, wherein the impact modifier (IM) is selected from the following copolymers:
  (i) elastomeric copolymers having glass transition temperature below 25° C., when measured according to according to ASTM D 3418, and comprising recurring units derived from one or more than one acrylic monomer selected from the group consisting of alkyl(meth)acrylates and acrylonitrile; and
  (ii) core-shell elastomers, including a central core and a shell at least partially surrounding the core, said core and said shell having different monomeric composition, and at least one of the core and/or shell being of elastomeric nature with a glass transition temperature below 25° C., when measured according to according to ASTM D 3418, and at least one of them comprising recurring units derived from one or more than one acrylic monomer selected from the group consisting of alkyl(meth)acrylates and acrylonitrile.

12. The polymer composition of claim 1, further comprising a polycarbonate polymer comprising recurring units ($R_{pc}$) represented by the following formula (IX):

(IX)

wherein $Ar^1$ is represented by the following formula (XII)

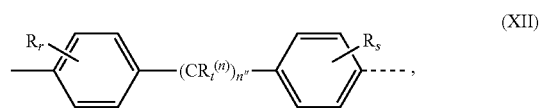
(XII)

and
wherein:
  each $R_t^{(n)}$ is independently selected from a halogen, an alkyl, a perhalogenated alkyl, an alkenyl, a perhalogenated alkynyl, an aryl, a perhalogenated aryl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, or any combination thereof;
  n" is an integer ranging from 1 to 20; and
  t is an integer ranging from 0 to 2.

13. The polymer composition of claim 1, wherein the at least one poly(aryl ether sulfone) (PAES) polymer is present in an amount ranging from about 40 wt. % to about 99 wt. % of the combined weight of the PAES and the PAEK.

14. A mobile electronic device comprising at least one structural part comprising the polymer composition of claim 1.

15. The polymer composition of claim 1, wherein said polymer composition exhibits a combination of a notched-Izod impact not less than about 200 J/m, a Sunscreen Test critical strain greater than or equal to 2.0%, and a CIE color L* of at least 91.0.

* * * * *